(12) United States Patent
Savry

(10) Patent No.: US 11,461,476 B2
(45) Date of Patent: *Oct. 4, 2022

(54) METHOD FOR EXECUTING A BINARY CODE OF A FUNCTION SECURED BY A MICROPROCESSOR

(71) Applicant: Commissariat a l'Energie Atomique et aux Energies Alternatives, Paris (FR)

(72) Inventor: Olivier Savry, Grenoble (FR)

(73) Assignee: Commissariat a l'Energie Atomique et aux Energies Alternatives, Paris (FR)

(*) Notice: Subject to any disclaimer, the term of this patent is extended or adjusted under 35 U.S.C. 154(b) by 173 days.

This patent is subject to a terminal disclaimer.

(21) Appl. No.: 16/823,419

(22) Filed: Mar. 19, 2020

(65) Prior Publication Data

US 2020/0302067 A1 Sep. 24, 2020

(30) Foreign Application Priority Data

Mar. 21, 2019 (FR) ...................................... 19 02951

(51) Int. Cl.
*G06F 21/60* (2013.01)
*G06F 9/22* (2006.01)
*G06F 9/30* (2018.01)

(52) U.S. Cl.
CPC ............ *G06F 21/602* (2013.01); *G06F 9/223* (2013.01); *G06F 9/3005* (2013.01)

(58) Field of Classification Search
CPC ............. H04L 9/06; G06F 7/57; G06F 21/556
See application file for complete search history.

(56) References Cited

U.S. PATENT DOCUMENTS 4,562,305 A 12/1985 Gaffney, Jr.
10,223,527 B2* 3/2019 Farchi .................. G06F 21/554
(Continued)

FOREIGN PATENT DOCUMENTS

EP 1 536 308 A2 6/2005
EP 3 457 620 A1 3/2019
WO WO 2012/010205 A1 1/2012

OTHER PUBLICATIONS

French Preliminary Search Report dated Feb. 3, 2020 in French Application 19 02951 filed on Mar. 21, 2019 (with English Translation of Categories of Cited Documents & Written Opinion), 11 pages.

(Continued)

*Primary Examiner* — Wasika Nipa
(74) *Attorney, Agent, or Firm* — Oblon, McClelland, Maier & Neustadt, L.L.P.

(57) ABSTRACT

A method for executing a binary code including the execution of an indirect load instruction which provokes the reading of a data line associated with an address obtained from the content of a destination register, then the construction of an initialization vector from the content of this data line, then the loading of this constructed initialization vector in a microprocessor, then the execution of an indirect branch instruction which provokes a branch directly to a first encrypted instruction line of a following basic block whose address is obtained from the content of the same destination register, then the decryption of the cryptogram of each encrypted instruction line of the following basic block using the initialization vector loaded in the microprocessor.

11 Claims, 7 Drawing Sheets

(56) References Cited

U.S. PATENT DOCUMENTS

| | | | |
|---|---|---|---|
| 10,740,452 B2* | 8/2020 | Hosie | G06F 21/42 |
| 2003/0046563 A1 | 3/2003 | Ma et al. | |
| 2005/0100163 A1 | 5/2005 | Buer | |
| 2010/0194609 A1* | 8/2010 | Meyer | G06F 11/1008 |
| | | | 341/52 |
| 2010/0241841 A1* | 9/2010 | Buer | G06F 21/72 |
| | | | 713/2 |
| 2011/0078420 A1* | 3/2011 | Trescher | G06F 21/77 |
| | | | 712/221 |
| 2017/0214523 A1* | 7/2017 | Pebay-Peyroula | H04L 9/0668 |
| 2019/0080096 A1 | 3/2019 | Savry | |
| 2019/0087566 A1* | 3/2019 | Hosie | G06F 21/125 |

OTHER PUBLICATIONS

Werner et al., "Protecting the Control Flow of Embedded Processors against Fault Attacks", International Conference on Financial Cryptography and Data Security, 2016, pp. 161-176.

* cited by examiner

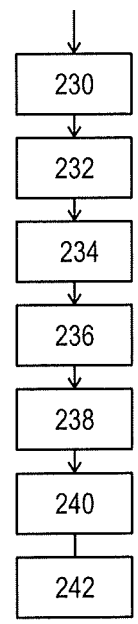 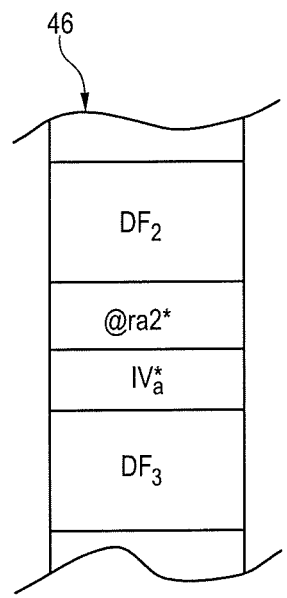
Fig. 11      Fig. 12
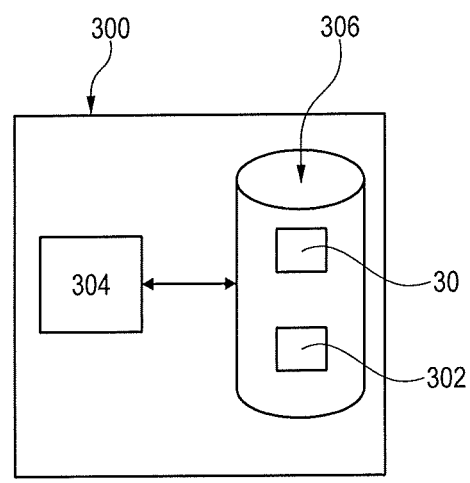
Fig. 13

METHOD FOR EXECUTING A BINARY CODE OF A FUNCTION SECURED BY A MICROPROCESSOR

The invention relates to a method for executing a binary code of a function secured by a microprocessor. The invention also relates to:
- a binary code of a secured function, an information storage medium and a microprocessor for implementing this execution method, and
- a compiler for generating this binary code.

To obtain information on a binary code or provoke unexpected functioning of the binary code, many attacks are possible. For example, attacks known as "fault injection" or "fault attack" can be implemented. These attacks consist in disrupting the operation of the microprocessor or of the memory containing the binary code, by various physical means such as modifications of the power supply voltages, modifications of the clock signal, exposure of the microprocessor to electromagnetic waves and other means.

Using such attacks, a hacker can alter the integrity of the machine instructions or of the data to, for example, retrieve a secret key of a cryptographic system, hijack the security mechanisms such as the verification of a PIN code during an authentication or simply prevent the execution of a function that is essential to the security of a critical system.

These attacks can notably provoke three types of faults, called execution faults, in the execution of the binary code:
1) an alteration of the instructions of the machine code executed,
2) an alteration of the data stored in the main memory or in registers of the microprocessor, and
3) an alteration of the control flow of the machine code.

The control flow corresponds to the execution path followed in the execution of the machine code. The control flow is conventionally represented in the form of a graph known as "control flow graph".

The binary code of a function can be instrumented to allow the detection and the signalling of execution faults. When the binary code of a function is thus instrumented, this binary code is qualified as "binary code of a secured function". In effect, contrary to the binary code of a non-secured function, this binary code is capable of allowing the signalling of execution faults typically encountered in cases of attacks.

On this topic, state of the art is known from:
EP3457620A1,
Werner Mario et AL: "Protecting the Control Flow of Embedded Processors against Fault Attacks", Oct. 3, 2016, International Conference on Financial Cryptography and Data security, pages 161-178,
WO2012/010205A1, and
US2017214523A1.

This state of the art describes solutions for securing the binary code against attacks which provoke a diversion of the execution flow.

The known solutions function correctly in the case of a static binary code, that is to say a binary code comprising only direct branch instructions. In fact, in this case, the function or functions which will be called, and therefore the way of decrypting them, are known at the time of generation of the binary code.

However, there are also dynamic binary codes, that is to say binary codes comprising indirect branch instructions used, for example, to trigger the execution of a secured external function. By way of illustration, the secured external function can be a function from a prestored library of secured functions. The location where such a library is stored is not known at the time of generation of the dynamic binary code. In this case, it is therefore essential to use indirect branch instructions to call the functions of the library at the time of the execution of the binary code. Indeed, the indirect branch instruction makes it possible to obtain the branch address from the content of a destination register of the microprocessor.

The content of the destination register is not known at the time of the compilation of the dynamic binary code. Furthermore, the binary code of the secured external function has generally been compiled independently of the dynamic binary code. Nor are the initialization vectors necessary to the decryptions of the basic blocks of the secured external function therefore known at the time of the compilation of the dynamic binary code.

Thus, the solutions proposed in WO2012/010205A1 and US2017214523A1 cannot be applied to such dynamic binary codes.

The objective here is to propose a method for executing a binary code of a secured function which offers at least simultaneously the following two possibilities:
   to function with dynamic binary codes, and
   to secure the binary code against the attacks which provoke a diversion of the execution flow.

The subject of the invention is therefore a method for executing a binary code of a function secured by a microprocessor.

Also a subject of the invention is a binary code of a secured function that is executable by a microprocessor for the implementation of the execution method.

Also a subject of the invention is an information storage medium that can be read by a microprocessor, this information storage medium containing the binary code Also a subject of the invention is a microprocessor for implementing the execution method, this microprocessor comprising an arithmetic and logic unit and a hardware securing module, wherein the hardware securing module is configured to construct the initialization vector from the content of the data line associated with the address obtained from the content of the destination register.

Finally, also a subject of the invention is a compiler capable of automatically converting a source code of a secured function into a binary code.

The invention will be better understood on reading the following description, given purely as a nonlimiting example and with reference to the drawings in which:

FIG. 11 is a flow diagram of the detail of a step of the method of FIG. 6 implemented to make buffer overflow attacks more difficult;

FIG. 12 is a schematic illustration of an execution stack of the device of FIG. 1;

FIG. 13 is a schematic illustration of a compiler capable of generating the binary code executed by the device of FIG. 1.

CHAPTER I: CONVENTIONS, NOTATIONS AND DEFINITIONS

Figure 1:
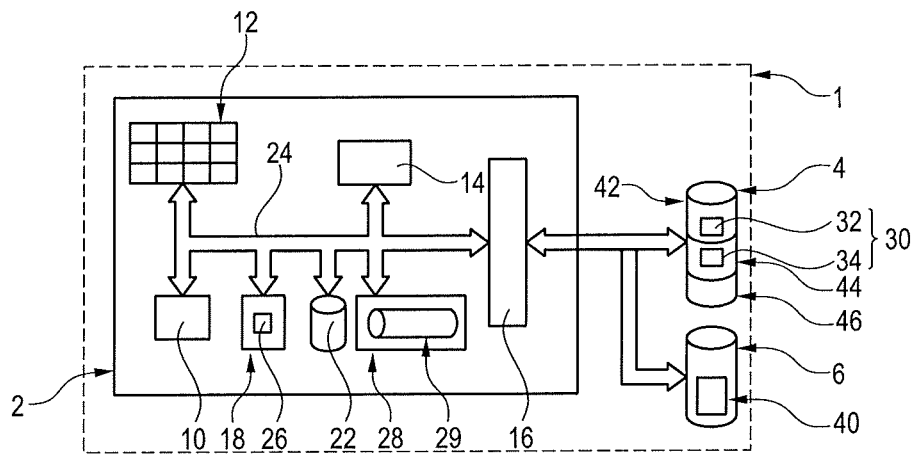
FIG. 1 is a schematic illustration of the architecture of an electronic device capable of executing a binary code of a secured function.

In the figures, the same references are used to designate the same elements. Hereinafter in this description, the features and functions that are known to the person skilled in the art are not described in detail.

In this description, the following definitions are adopted.

A "program" designates a set of one or more predetermined functions that are desired to be executed by a microprocessor.

A "source code" is a representation of the program in a computer language, not directly executable by a microprocessor and intended to be converted by a compiler into a machine code that is directly executable by the microprocessor.

A program or a code is said to be "directly executable" when it can be executed by a microprocessor without this microprocessor needing first to compile it by means of a compiler or interpret it by means of an interpreter.

An "instruction" designates a machine instruction that is executable by a microprocessor. Such an instruction is composed:
  of an opcode, or operation code, coding the nature of the operation to be executed, and
  of one or more operands defining the value or values of the parameters of this operation.

A "machine code" is a set of machine instructions. This is typically a file containing a succession of bits having the value "0" or "1", these bits coding the instructions to be executed by the microprocessor. The machine code is directly executable by the microprocessor, that is to say without requiring prior compilation or interpretation.

A "binary code" is a file containing a succession of bits having the value "0" or "1". These bits code data and instructions to be executed by the microprocessor. Thus, the binary code comprises at least a machine code and, in addition, generally, digital data processed by this machine code.

An "instruction flow" is a succession of instructions ranked one after the other and which forms, in the machine code, an ordered series of bits. The instruction flow begins with an initial instruction and ends with a final instruction. Relative to a given instruction of the instruction flow, the instructions situated on the side of the initial instruction are called "preceding instructions" and the instructions situated on the side of the final instruction are called "following instructions". In this text, this instruction flow in memory is subdivided into a succession of basic blocks that are immediately consecutive or separated by data blocks.

In this text, a "basic block" is a group of successive instructions of the instruction flow which begins at a branch address and which ends with a single explicit or implicit branch instruction. An explicit branch instruction is characterized by the explicit presence of an opcode in the machine code which codes the branch instruction. An implicit branch instruction corresponds to the case where the execution of a preceding basic block is continued systematically with the execution of a following basic block situated, in the machine code, immediately after the preceding basic block. In this case, given that, in the absence of an explicit branch instruction, the instructions of the machine code are executed in order one after the other, it is not necessary to introduce, at the end of the preceding basic block, an explicit branch instruction to the following basic block. In this description, it is said that in this case, the preceding basic block ends with an implicit branch instruction because it is not explicitly coded in the machine code. In this case, the preceding basic block ends just before the branch address of the following basic block. In this application, the expression "branch instruction" designates an explicit branch instruction unless stipulated otherwise. Thus, the execution of a basic block begins systematically with the execution of its first instruction and ends systematically with the execution of the branch instruction which ends this basic block. A basic block does not include branch instructions other than that situated at the end of this basic block. Thus, the instructions of a basic block are systematically all read by the microprocessor one after the other in the order in which they are present in this basic block. The branch instruction can direct, when it is executed, the control flow systematically to the same branch address or, alternatively, to different branch addresses. The latter case is encountered, for example, when, at the end of the basic block executed, the control flow can be continued to a first and, alternatively, to a second, basic block.

A "branch instruction" is an instruction which, when it is executed by the microprocessor, triggers a jump to the branch address of another basic block. Typically, to this end, this instruction replaces the current value of the ordinal counter with the value of the branch address. It will be recalled that the ordinal counter contains the address of the following instruction to be executed by the microprocessor. In the absence of branch instruction, each time an instruction is executed, the ordinal counter is incremented by the size of the instruction currently executed. In the absence of branch instruction, the instructions are systematically executed sequentially one after the other in the order in which they are stored in a main memory. The branch instruction can be unconditional, that is to say that the jump to the branch address is systematically performed as soon as this instruction is executed. An unconditional branch instruction is for example the instruction "JAL" in the "RISC V" instruction set. The branch instruction can also be conditional, that is to say that the jump to the branch address is triggered upon its execution only if a particular condition is satisfied. For example, a conditional branch instruction is a "BRANCH" in the "RISC-V" instruction set. The branch instruction can be a call to a function. In this text, unless stipulated otherwise, the term "branch instruction" designates both direct and indirect branch instructions. A direct branch instruction is a branch instruction which directly contains the digital value of the branch address. An indirect branch instruction is a branch instruction to a branch address contained in a memory or a register of the microprocessor. Thus, contrary to a direct branch instruction, an indirect branch instruction does not directly contain the digital value of the branch address. For example, an indirect branch instruction is the instruction "JALR" of the RISC-V instruction set.

A "branch address" is the address in the main memory at which the first instruction line of a basic block is located.

Consequently, the term branch address is used even for the basic blocks in which the first instruction is executed following the execution of an implicit branch instruction.

The expression "execution of a function" is used to designate the execution of the instructions performing that function.

In the interests of simplicity, in this description and in the figures, the instructions are not represented in binary form, but rather in a symbolic form expressed in a higher level advanced language.

CHAPTER II: ARCHITECTURE OF THE DEVICE

FIG. 1 represents an electronic device 1 comprising a microprocessor 2, a main memory 4 and a mass storage medium 6. For example, the device 1 is a computer, a smartphone, an electronic tablet or the like.

The microprocessor 2 here comprises:
- an arithmetic and logic unit 10;
- a set 12 of registers;
- a command module 14;
- a data input/output interface 16,
- an instruction loader 18 comprising an ordinal counter 26,
- a queue 22 of instructions to be executed, and
- a hardware securing module 28.

The memory 4 is configured to store instructions and data of a binary code 30 of a program that has to be executed by the microprocessor 2. The memory 4 is a random-access memory. Typically, the memory 4 is a volatile memory. The memory 4 can be a memory external to the microprocessor 2 as represented in FIG. 1. In this case, the memory 4 is produced on a substrate mechanically separated from the substrate on which the different elements of the microprocessor 2 such as the unit 10 are produced.

Here, the memory 4 is divided into successive machine words of fixed length. Each machine word can be transferred in a single clock cycle from the memory 4 into a register of the microprocessor. To this end, the size $N_{MM}$ of a machine word is equal to the maximum number of bits that can be transferred simultaneously from the memory 4 to a register of the set 12. Here, the size $N_{MM}$ is strictly greater than $N_{inst}$ bits, in which $N_{inst}$ bits is the number of bits of the instructions of the instruction set of the microprocessor 2. Typically, $N_{inst}$ is an integer greater than or equal to 8, 16, 32 or 64. In this example, $N_{inst}$ is equal to 32 and the size $N_{MM}$ is equal to 128 bits.

Conventionally, the memory 4 is primarily divided into three parts:
- a first part 42 containing the instructions to be executed,
- a second part 44 containing the data to be processed, and
- a third part 46 used to back up the execution context of a function when it calls another function.

The part 46 is known by the term "execution stack" or "call stack". Consequently, hereinbelow, the part 46 is also called "stack 46".

The binary code 30 notably comprises a machine code 32 of a secured function and a block 34 of data necessary for executing of the binary code 30. The machine code 32 and the block 34 are stored in, respectively, the parts 42 and 44.

Each secured function corresponds to a set of several code lines, for example several hundreds or thousands of code lines, stored at successive addresses in the memory 4. Here, each code line corresponds to a machine word. Thus, a code line is loaded into a register of the microprocessor 2 in a single read operation. Likewise, a code line is written in the memory 4 by the microprocessor 2 in a single write operation. Each code line corresponds to a single instruction or to a single datum. Subsequently, when the code line contains an instruction, it is called "instruction line". When the code line contains a datum, it is called "datum line". The structures of an instruction line and of a data line are described in detail with reference to FIGS. 2 and 8.

The block 34 is typically situated within a predetermined range of addresses at the start of the binary code 30. Thus, the execution of the binary code 30 begins with the loading and the processing of the data of the block 34. Here, the block 34 notably comprises:
- a cryptogram ka* obtained by encrypting a key ka using a public key $pk_{CPU}$ of the microprocessor 2, and
- cryptograms $iv_{msbi}^*$, $iv_{ctei}^*$, $iv_{msbd}^*$, $iv_{cted}^*$, $iv_{pile}^*$, $iv_{ctep}^*$, encrypted using the public key $pk_{CPU}$, of different values intended to initialize the content of different registers of the microprocessor 2 in order to allow the decryption of the binary code 30.

As an illustration, the microprocessor 2 conforms to the RISC ("Reduced Instructions Set Computer") architecture and it implements the "RISC-V" instruction set.

Here, the unit 10 is an arithmetic and logic unit of $N_{inst}$ bits.

The loader 18 loads in the queue 22 the following instruction to be executed by the unit 10 from the part 42 of the memory 4. More specifically, the loader 18 loads the instruction to which the ordinal counter 26 points.

The unit 10 is notably configured to execute the instructions loaded in the queue 22 one after the other. The instructions loaded in the queue 22 are generally systematically executed in the order in which these instructions have been stored in this queue 22. The unit 10 is also capable of storing the result of these executed instructions in one or more of the registers of the set 12.

In this description, "execution by the microprocessor 2" and "execution by the unit 10" will be used synonymously.

The module 14 is configured to move data between the set 12 of registers and the interface 16. The interface 16 is notably capable of acquiring data and instructions, for example, from the memory 4 and/or the medium 6 external to the microprocessor 2.

The module 28 is capable of automatically executing the different operations described in detail in the following chapters to secure the execution of the secured functions. The module 28 functions independently and without using the unit 10.

Thus, it is capable of processing the code lines before and/or after the latter are processed by the unit 10. To this end, it notably comprises a secured non-volatile memory 29. No access to this memory 29 without involving the module 28 is provided. In this embodiment, the module 28 is preprogrammed, for example in its design, to execute operations such as the following operations:
- checking the integrity and the authenticity of a datum from a message authentication code better known by the acronym MAC ("Message Authentication Code"),
- constructing a message authentication code,
- encrypting a datum to obtain a cryptogram,
- decrypting a cryptogram to obtain an uncoded datum,
- executing a preprogrammed function $F_{iv}$.

Figure 6:
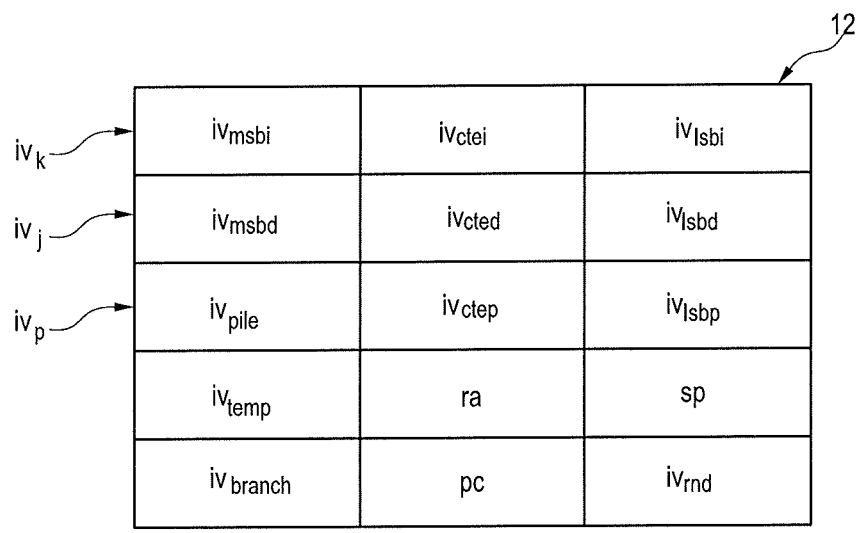
FIG. 6 is a schematic illustration of different registers of the electronic device, used in the execution of the secured function.

The memory 29 is used to store the secret information necessary to the implementation of the method of FIG. 6. Here, it therefore notably comprises secret information pre-stored before the start of the execution of the binary code 30. In particular, it comprises the following prestored information:

a secret key k' used for the verification of the message authentication codes, a secret private key $sk_{CPU}$ which makes it possible to decrypt the data which have been encrypted using the public key $pk_{CPU}$.

In this exemplary embodiment, the set 12 comprises general registers that can be used to store any data. The size of each of these registers is, for example, equal to $N_{MM}$.

A data exchange bus 24 which links the different components of the microprocessor 2 to one another is represented in FIG. 1 to indicate that the different components of the microprocessor can exchange data between them.

The medium 6 is typically a non-volatile memory. For example, it is a memory of EEPROM or Flash type. Here it contains a backup copy 40 of the binary code 30. Typically, it is this copy 40 which is automatically copied into the memory 4 to restore the code 30, for example, after a current outage or the like or just before the execution of the code 30 begins.

CHAPTER III: SECURING OF THE MACHINE CODE

Here, the structure of the machine code of the secured function is described in the particular case of the machine code 32. However, what is described in this particular case can be adapted without difficulty to any machine code of a secured function The machine code 32 comprises a succession of instruction lines $LI_j$ stored one after the other in the memory 4. Subsequently, in this chapter, the index j is used to identify the instruction line $LI_j$ from among the other instruction lines of the machine code 32. Furthermore, the index j is also used as a serial number indicating the order in which the lines $LI_j$ are ranked. Thus, the instruction line situated immediately after the line $LI_j$ is denoted $LI_{j+1}$. Each instruction line $LI_j$ codes an instruction of the instruction set of the microprocessor 2 capable of being executed after having been decrypted and decoded by the unit 10 of this microprocessor.

The structures of all the lines $LI_j$ are identical. This structure is represented in detail in FIG. 2 in the particular case of the line $LI_j$.

The line $LI_j$ comprises a cryptogram $CI_j^*$, a code $MAC_j$, and a code $ECC_{Lj}$.

The cryptogram $CI_j^*$ is obtained by encrypting a concatenation $CI_j$ using the secret key ka and an initialization vector $iv_k$. More specifically, the cryptogram $CI_j^*$ is obtained using the following relationship: $CI_j^*=f_{ka}(CI_j; iv_k)$, in which $f_{ka}$ is an encryption function corresponding to a decryption function $f_{ka}^{-1}$ preprogrammed in the module 28. Typically, the function $f_{ka}$ is a symmetrical encryption function. Consequently, the key ka that makes it possible to decrypt the cryptogram $CI_j^*$ is prestored in the memory 29 in order to allow the module 28 to decrypt this cryptogram $CI_j^*$. The initialization vector $iv_k$ is constructed as described later in this chapter.

The concatenation $CI_j$ is, here, the concatenation of an instruction $I_j$ to be executed by the microprocessor 2 and of a code $ECC_{Ij}$. The code $ECC_{Ij}$ makes it possible to detect an error in the instruction $I_j$ and, possibly, correct this error. For example, the code $ECC_{Ij}$ can be the code known by the acronym BCH (Bose, Ray-Chaudhuri, Hocquenghem) which offers the advantage of being particularly easy to implement. However, any other known error detecting or correcting code can be implemented. The size of the code $ECC_{Ij}$ is greater than or equal to 1 or 2 or 3 bits and, generally less than $N_{inst}$. The size of the code $ECC_{Ij}$ is determined as a function of the desired robustness. The greater the desired capability to correct a large number of erroneous bits in the instruction $I_j$, the greater the size of the code $ECC_{Ij}$.

The code $MAC_j$ is a code that makes it possible to check the integrity and the authenticity of the cryptogram $CI_j^*$. This code is commonly called "message authentication code" and known by the acronym MAC. Such a code $MAC_j$ is obtained by constructing a label from the cryptogram $CI_j^*$ which normally comprises fewer bits than the cryptogram $CI_j^*$. This label is constructed using a predetermined function and the secret key k' known only to the author of the binary code 30 and to the microprocessor 2. Here, the key k' is prestored in the memory 29. For example, the predetermined function is a hash function. In this case, generally, the label is the result of application of this hash function to a combination, for example a concatenation, of the cryptogram $CI_j^*$ and of the key k'.

As an example, to generate the cryptogram $CI_j^*$ and the code $MAC_j$, an authenticated encryption algorithm is used. This authenticated encryption algorithm can be chosen from among the various candidates at the CAESAR competition (CAESAR standing for "Competition for Authenticated Encryption: Security, Applicability, and Robustness") such as, for example, one of the algorithms designated by the following names: "ACORN", "ASCON", "SILC", "CLOC", "JAMBU", "KETJE".

The code $ECC_{Lj}$ is an error correcting code which makes it possible to detect and correct an error in the cryptogram $CI_j^*$ and the code $MAC_j$. It is for example constructed as described in the case of the code $ECC_{Ij}$.

The cryptogram $CI_j^*$ and the codes $ECC_{Ij}$, $MAC_j$ and $ECC_{Lj}$ are, typically, constructed at the time when the machine code 32 is generated.

Subsequently, the address in the memory 4 at which the line $LI_j$ is stored is denoted $@_j$.

The machine code 32 is composed of a succession of basic blocks which must be executed one after the other. Here, there is a first type of structure and a second type of structure for the basic blocks. Subsequently the basic blocks which have structures of the first and of the second types are called, respectively, "block of the first type" and "block of the second type". The first type of structure is used in direct branch cases. The second type of structure is used in indirect branch cases.

Figure 3:
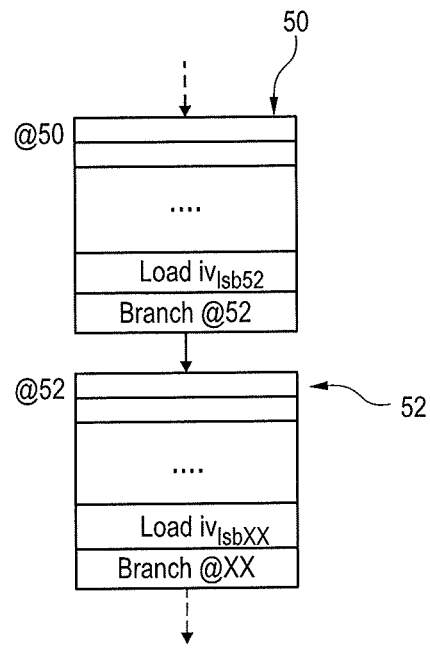

FIG. 3 represents the first type of structure. More specifically, FIG. 3 represents a first arrangement of two basic blocks 50 and 52 of the machine code 32. In this first arrangement, the basic blocks 50 and 52 are systematically executed one after the other. In the order of execution, the basic block 50 precedes the basic block 52. In this figure and in the subsequent figures:

the order of execution of the basic blocks is represented by an arrow which points from the preceding basic block to the following basic block, a dotted line arrow which points to a basic block which is represented indicates that the basic block or blocks which precede this basic block have not been represented to simplify the figure, a dotted line arrow which points at nothing from a basic block that is represented indicates that the basic block or blocks following this basic block that is represented have not been represented to simplify the figure, the symbol " . . . " in a basic block indicates that not all the instruction lines of this basic block have been represented.

Each basic block is composed of a succession of instruction lines each of which comprises the cryptogram $CI_j^*$ of the instruction $I_j$ to be executed and the code $MAC_j$. Furthermore, each basic block begins with a branch address and ends with an instruction line which contains the cryptogram of a branch instruction. More specifically, in the case of the first type of structure, the first line of the basic block, situated at the branch address, is the first instruction line of the basic block. The basic block of the first type does not comprise any datum line.

Figure 2:
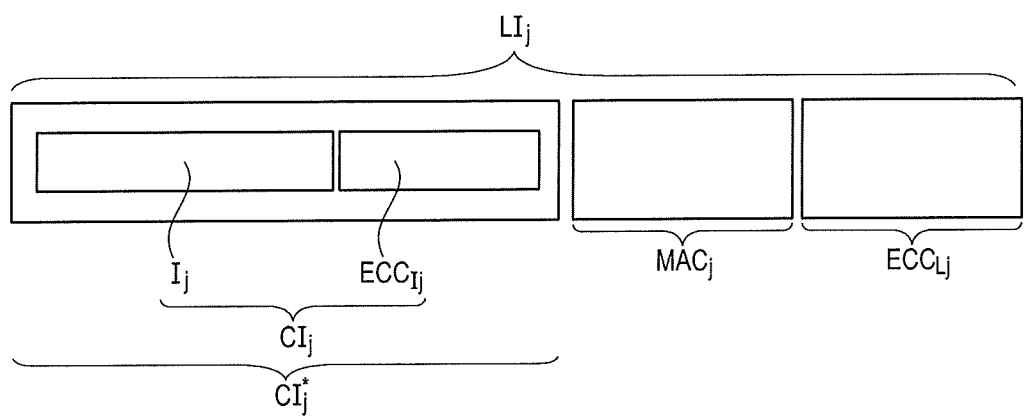
FIG. 2 is a schematic illustration of the structure of an instruction line coding an instruction of the binary code executed by the device of FIG. 1, FIGS. 3 to 5 are schematic illustrations of different portions of the binary code of the secured function likely to be executed by the device of FIG. 1.

In FIG. 2, the symbols "@50" and "@52" alongside the first line of each basic block designate the branch addresses, respectively, of the basic blocks 50 and 52. The symbol "@XX" designates the branch address of another basic block that is not represented in FIG. 2.

The symbol "Load $iv_{lsbXX}$" indicated in the penultimate instruction line in the basic block indicates that this instruction line comprises the cryptogram of a direct load instruction. When the direct load instruction is executed by the microprocessor 2, it provokes the loading of a new value $iv_{lsbXX}$ in a register $iv_{branch}$ of the microprocessor 2. The value $iv_{lsbxx}$ is directly contained in the instruction "Load $iv_{lsbxx}$". In other words, the value $iv_{lsbxx}$ is an operand of the instruction "Load $iv_{lsbxx}$". It will be noted that the value $iv_{lsbxx}$ is, here, coded on 32 bits and therefore has the same length as an instruction. Thus, although this text talks of a direct load instruction, in practice, this instruction is generally implemented in the form of first and a second 32-bit instructions from the instruction set of the microprocessor 2. Typically, when they are executed, the first instruction loads a first part of the bits of the value $iv_{lsbxx}$ in the register $iv_{branch}$ and the second instruction loads the other bits of the value $iv_{lsbxx}$ in this register $iv_{branch}$.

The symbol "xx" in the value $iv_{lsbxx}$ is an identifier of this value. In fact, each time the instruction "Load $iv_{lsbxx}$" is executed, it provokes the loading of a specific value which makes it possible to decrypt the instruction lines of the following basic block. Thus, the symbol "Load $iv_{lsb52}$" indicates that the value $iv_{lsb52}$ is loaded in the register $iv_{branch}$ before the execution of the basic block 52 begins.

The symbol "Branch @XX" indicated in the last instruction line of the basic block indicates that this last line comprises the cryptogram of a direct branch instruction which, when it is executed by the microprocessor 2, provokes a direct branch to the branch address @XX. When it is executed, this instruction also provokes the loading of the value contained in the register $iv_{branch}$ in a register $iv_{lsbi}$ of the microprocessor 2. The register $iv_{lsbi}$ contains the 32 least significant bits of the initialization vector $iv_k$ currently used to decrypt the instruction lines.

In this embodiment, the vector $iv_k$ is coded on 128 bits. The 32 most significant bits are stored in a register $iv_{msbi}$. The 64 bits situated between the 32 least significant bits and the 32 most significant bits are stored in one or more registers collectively designated by the term "register $iv_{ctei}$". Each vector $iv_k$ is therefore the result of the concatenation of the bits of the registers $iv_{msbi}$, $iv_{ctei}$ and $iv_{lsbi}$. Here, the values contained in the registers $iv_{msbi}$ and $iv_{ctei}$ are constant throughout the execution of the machine code. For example, the registers $iv_{msbi}$ and $iv_{ctei}$ are loaded with these constant values at the start of the execution of the machine code 32. These constant values are obtained by decrypting the cryptograms $iv_{msbi}^*$ and $iv_{ctei}^*$ contained in the block 34.

The same initialization vector $iv_k$ is used to decrypt all the cryptograms $CI_j^*$ of all the instruction lines of the same basic block $BB_k$. The index k unambiguously identifies the basic block $BB_k$ from among all of the basic blocks of the machine code 32. In the figures and in the description, the symbol $iv_k$ is subsequently used to generally designate the initialization vector to be used to decrypt the instruction lines of the basic block $BB_k$. Furthermore, in the simple cases like that represented in FIG. 3 where two basic blocks follow one another in the order of execution of the machine code 32, the index k is also used to indicate the order in which these basic blocks are executed. For example, the notation $BB_{k-1}$ is, in these simple cases, used to designate the preceding basic block systematically executed immediately before the basic block $BB_k$.

Here, the initialization vector $iv_k$ is unique for each basic block $BB_k$. "Unique for each basic block" designates the fact that the probability of two different basic blocks of the machine code 32 being encrypted with the same initialization vector $iv_k$ is less than one chance in 100 or in 1000. In particular, the expression "unique for each basic block" therefore covers the case in which the initialization vectors $iv_k$ of all the basic blocks are systematically different to one another. For example, in a simple embodiment, upon the generation of the code 32, the 32 least significant bits of the initialization vectors $iv_k$ of each basic block are drawn randomly or pseudo-randomly from the set $\{1; \ldots; 2^{Ninst}\}$.

As represented in FIG. 3, in the code 32, the 32 least significant bits of the initialization vector $iv_k$ are loaded in the register $iv_{branch}$ only upon the execution of a basic block preceding the basic block $BB_k$. In FIG. 3, the initialization vector $iv_{lsb52}$ necessary to decrypt the block 52 is loaded upon the execution of the block 50.

Figure 4:
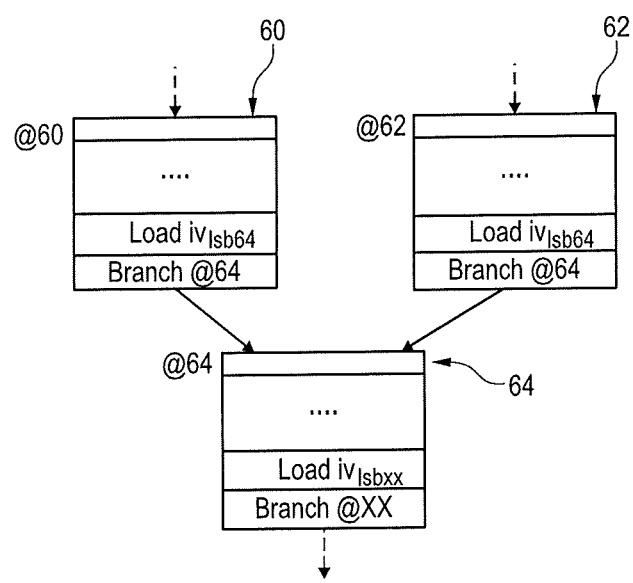

FIG. 4 represents another possible arrangement of several basic blocks of the code 32 in the particular case of two preceding basic blocks 60 and 62 and one following basic block 64. The blocks 60, 62 and 64 are basic blocks of the first type. Here, the blocks 60 and 64 are, for example, identical, respectively, to the blocks 50 and 52, except that the 32 least significant bits of the initialization vector of the block 64 are denoted "$iv_{lsb64}$". The block 62 is constructed like the block 60 and, in particular, it ends with two instruction lines which code the same instructions as those coded in the last two lines of the block 60. However, even though these last two lines code the same instructions, the cryptograms of these instructions are different because the block 62 is encrypted by using an initialization vector $iv_{62}$ that is different from the vector $iv_{60}$ used to encrypt the block 60. The other instruction lines of the block 62 are different from those of the block 60.

Figure 5:
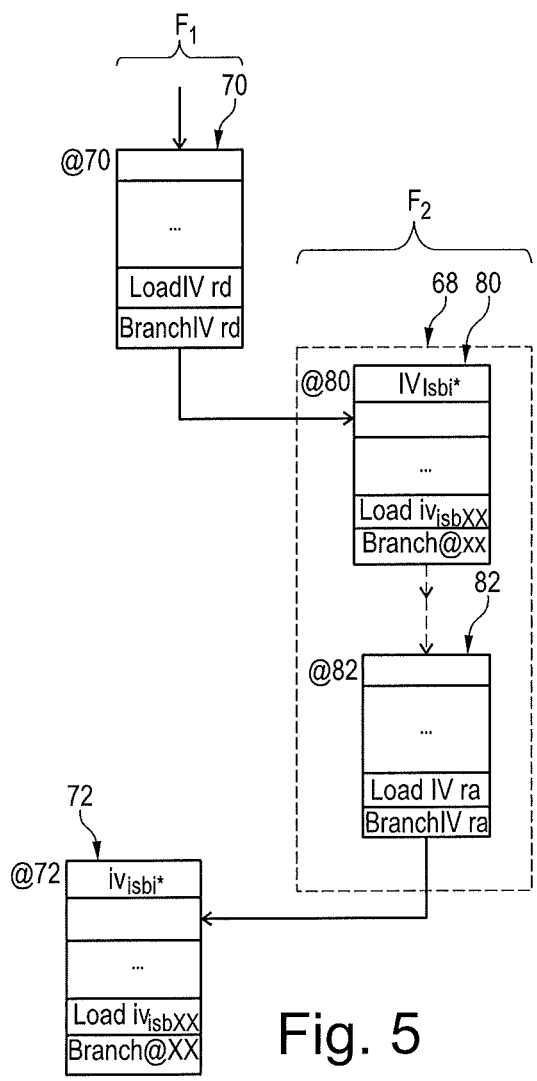

FIG. 5 represents a part of the architecture of the machine code 32 when a function $F_1$ of the machine code 32 calls an external function $F_2$. To this end, the machine code of the function $F_1$ comprises a basic block 70 which ends with a call to the machine code 68 of the function $F_2$.

The machine code 68 is arranged as previously described for the machine code 32. It is therefore composed of a succession of basic blocks. To simplify FIG. 5, only the first basic block 80 and the last basic block 82 of this machine code 68 have been represented. Here, when the execution of the function $F_2$ is finished, that is to say after the execution of the block 82, the execution of the machine code 32 continues with the execution of a basic block 72.

The instruction lines of the blocks 70, 72, 80 and 82 are encrypted using, respectively, vectors $iv_{70}$, $iv_{72}$, $iv_{88}$ and $iv_{82}$.

Here, the machine code 32 is a dynamic code which has been generated independently of the machine code 68. For example, the machine code 68 has been generated before or after the machine code 32 was generated. For example, the machine code 68 is the code of a function from a library of pre-stored functions. In this case, typically, the machine code 68 can be called, at different instants, by different machine codes. The address @80 at the block 80 is not therefore known at the time when the machine code 32 is compiled. Because of that, the block 70 ends with an instruction line containing the cryptogram of an indirect branch instruction denoted "BranchIV rd" in FIG. 5. When the instruction "BranchIV rd" is executed by the microprocessor 2, it provokes a jump to a branch address @, constructed from the current content of a register rd of the microprocessor 2. The construction of the address $@_j$ from the content of the register rd is typically performed using the following relationship: $@_j$=rd+offset+4, in which:

$@_j$ is the address constructed, rd is the value contained in the register rd,

"offset" is a predetermined numeric value, and the symbol "+4" indicates that a constant value is added to the result of the sum rd+offset so that the address $@_j$ is equal to the address of the instruction line which immediately follows that situated at the address rd+offset.

Conventionally, the value "offset" is entered as operand of the instruction "BranchIV rd"

At this stage, it will be noted that, when the sum rd+offset corresponds to the address of the first line of a basic block, the sum rd+offset+4 corresponds to the address of the second line of this basic block. Thus, contrary to a conventional indirect branch instruction, the instruction "Branch IV" provokes a jump directly to the second line of the following basic block. The first line of this following basic block is therefore not executed in this embodiment.

The register rd is loaded with a value that makes it possible to construct the address @80. Typically, the register rd is loaded with a value which makes it possible to construct the address @80, at the start of the execution of the binary code 30, by "dynamic library loader" or simply "loader". This dynamic library loader is, for example, that of an operating system executed by the microprocessor 2. Since this dynamic library loading mechanism is well known, it is not described here.

Similarly, since the machine code 68 to be executed is not known at the time of the compilation of the machine code 32, nor is the vector iv$_{80}$ to be used to decrypt the instruction lines of this block 80 known. It is therefore not possible to introduce, upon the compilation of the machine code 32, the instruction "Load iv$_{lsb80}$", previously described, in the block 70 to provoke the direct loading of the vector iv$_{lsb80}$ in the register iv$_{branch}$. Instead, upon the generation of the machine code 32, an indirect load instruction for an initialization vector, denoted "LoadIV rd", is introduced just before the instruction "BranchIV rd". When it is executed by the microprocessor 2, the instruction "Load IV rd" provokes:

the reading of the content of the datum line situated at an address constructed from the content of the register rd, then the construction of the 32 least significant bits of the vector iv$_{80}$ from the content of the datum line read, then the loading of the 32 least significant bits thus constructed in the register iv$_{branch}$.

Here, in the case of the instruction "Load IV rd", the construction of an address from the content of the register rd is performed using the following relationship: $@_k$=rd+offset, in which "rd" and "offset" are the same as those used in the instruction "BranchIV rd". Thus, the address constructed is the address of the first line of the following basic block. Consequently, the address of the first line of the basic block BB$_k$ is denoted $@_k$.

To this end, the block 80 is a basic block of the second type. A basic block BB$_k$ of the second type is identical to a basic block of the first type except that the first line of this basic block comprises a datum line LD$_k$ and not an instruction line. This line LD$_k$ contains the data that make it possible to construct the 32 least significant bits of the initialization vector iv$_k$ used to encrypt the instruction lines of this basic block BB$_k$. To this end, it comprises a cryptogram, denoted iv$_{lsbi}$* in the figures, of the 32 least significant bits of the vector iv$_k$. In this embodiment, the cryptogram iv$_{lsbi}$* is obtained using the following relationship: iv$_{lsbi}$*=f$_{ka}$(iv$_{lsbi}$; iv$_j$), in which:

iv$_{lsbi}$ is the value of the 32 least significant bits of the vector iv$_k$, iv$_j$ is an initialization vector, different from the vector iv$_k$, used to encrypt the data lines, and the function f$_{ka}$ is the same as that previously described in the case of the encryption of the instructions.

The structure of a datum line such as the line LD$_k$ is described later with reference to FIG. 8.

In a way similar to what was described for the vector iv$_k$, the vector iv$_j$ is coded on 128 bits. The 32 most significant bits are stored in a register iv$_{msbd}$. The 32 least significant bits are stored in a register iv$_{lsbd}$. The 64 bits situated between the 32 least significant bits and the 32 most significant bits are stored in one or more registers collectively designated by the term "register iv$_{cted}$". Each vector iv$_j$ is therefore the result of the concatenation of the bits of the registers iv$_{msbd}$, iv$_{cted}$ and iv$_{lsbd}$. Here, the contents of the registers iv$_{msbd}$ and iv$_{cted}$ are constant throughout the execution of the machine code. For example, the registers iv$_{msbd}$ and iv$_{cted}$ are loaded with these constant values at the start of the execution of the machine code 32. Preferably, the values loaded in the registers iv$_{msbd}$ and iv$_{cted}$ are different from those loaded in the registers iv$_{msbi}$ and iv$_{ctei}$.

The content of the register iv$_{lsbd}$, used upon the encryption of the data, is a function of the address $@_k$ where the line LD$_k$ is stored. To this end, the module 28 comprises a preprogrammed function F$_{iv}$ which, with each address $@_j$ of the memory 4, associates a different value of the register iv$_{lsbd}$. For example, the function F$_{iv}$ is a hash or encryption function. There is therefore the following relationship: iv$_{lsbd}$=F$_{iv}$($@_j$), in which iv$_{lsbd}$ designates the content of the register iv$_{lsbd}$.

The machine code 68 can be called from different basic blocks of the machine code 32 or from different machine codes. Thus, the basic block which has to be executed after the basic block 82 depends on the basic block which has called the machine code 68. It is not known at the time of the generation of the machine code 68. Consequently, like the block 70, the basic block 82 is a basic block of the first type which ends with an instruction line which codes an instruction "LoadIV ra" followed by an instruction line which codes the instruction "BranchIV ra". The instructions "LoadIV ra" and "BranchIV ra" are identical, respectively, to the instructions "LoadIV rd" and "BranchIV rd" previously described, except that the register rd is replaced by the register ra.

When the code 68 is called from the block 70, the return address @72 of the machine code 68 is typically backed up in the register ra of the microprocessor 2. If the machine code 68 itself calls another function, then the address @72 is backed up in the execution stack 46 and restored in the register ra just before executing the instructions "LoadIV ra" and "BranchIV ra" of the block 82.

The block 72 is a basic block of the second type. Its first line at the address @72 is therefore a datum line which contains the cryptogram $iv_{lsbi}*$ necessary to construct the vector $iv_{72}$ which makes it possible to decrypt its instruction lines.

FIG. 6 represents the main registers described hitherto. These registers can be registers of the set 12 and/or registers of the module 28. Preferably, the registers of the module 28 are used to store the information used to encrypt or decrypt. Thus, preferably, the registers $iv_{msbi}$, $iv_{ctei}$, $iv_{lsbi}$, $iv_{msbd}$, $iv_{cted}$, $iv_{lsbd}$, $iv_{pile}$, $iv_{ctep}$, $iv_{lsbp}$, $iv_{temp}$, $iv_{branch}$, $iv_{rnd}$ are registers contained in the memory 29. In addition to the registers already described, the microprocessor 2 comprises registers $iv_{cted}$, $iv_{lsbd}$, $iv_{pile}$, $iv_{ctep}$, $iv_{lsbp}$, $iv_{temp}$, $iv_{branch}$, $iv_{rnd}$ and sp described in more detail in the following chapters.

Figure 7:
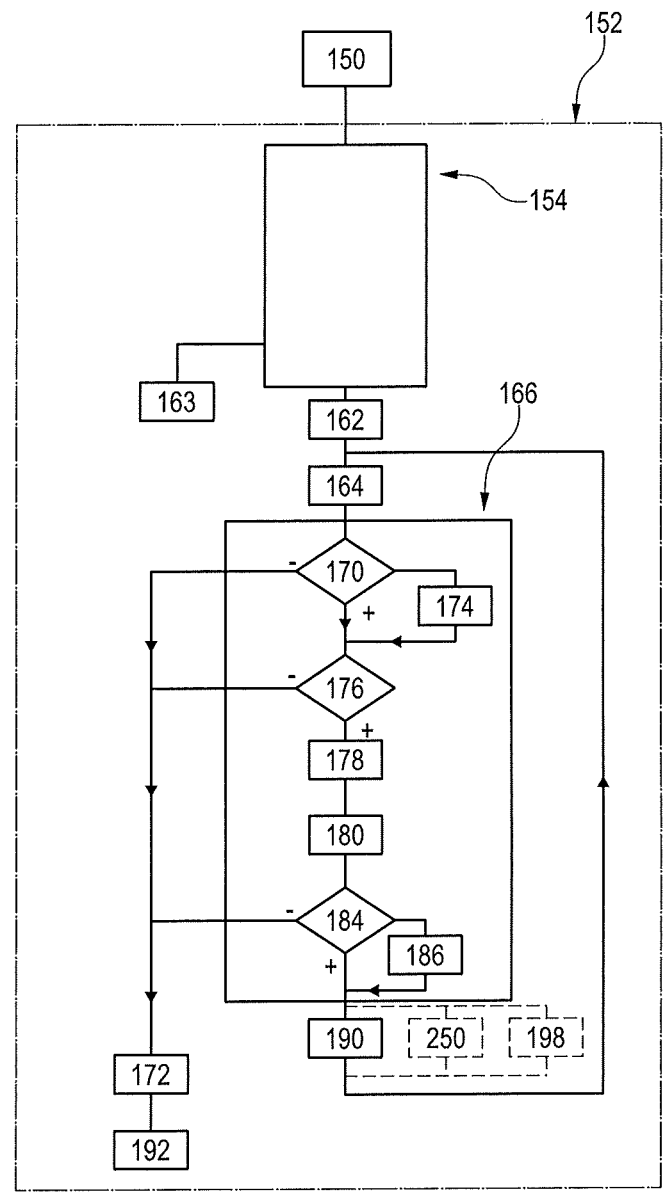
FIG. 7 is a flow diagram of a method for executing the binary code of the secured function.

FIG. 7 represents a method for execution of the binary code 30 by the microprocessor 2.

The method begins with a step 150 of provision of the binary code 30 in the memory 4. For that, for example, the microprocessor 2 copies the copy 40 in the memory 4 to obtain the binary code 30 stored in the memory 4.

Then, in a phase 152, the microprocessor 2 executes the binary code 30 and, in particular, the machine code 32.

Possibly, the execution of the binary code 30 commences with a step 154 of authentication of the author of this binary code. If all the authentication has been completed successfully, then the method continues with a step 162. On the other hand, if the authentication has not been successful, the module 28 then considers that the authentication of the author of the binary code 30 has failed and the method continues with a step 163. In the step 163, the execution of the binary code 30 is stopped.

In the step 162, the module 28 loads the cryptograms $ka*$ and $iv_{msbi}*$, $iv_{ctei}*$, $iv_{lsbi}*$, $iv_{msbd}*$, $iv_{cted}*$, $iv_{pile}*$, $iv_{ctep}*$ contained in the block 34 and decrypts them using the key $sk_{CPU}$ contained in the memory 29. The module 28 initializes the values contained in the registers $iv_{msbi}$, $iv_{ctei}$, $iv_{lsbi}$, $iv_{msbd}$, $iv_{cted}$, $iv_{pile}$, $iv_{ctep}$ from, respectively, the decrypted cryptograms $iv_{msbi}*$, $iv_{ctei}*$, $iv_{lsbi}*$, $iv_{msbd}*$, $iv_{cted}*$, $iv_{pile}*$, $iv_{ctep}*$. At the end of the step 162, the key ka and the initialization vector $iv_k$ used to decrypt the first basic block of the machine code 32 are contained in the memory 29.

After the step 162, the microprocessor 2 executes, one after the other, the basic blocks, commencing with the first basic block $BB_1$ of the machine code 32.

The execution of each basic block consists in executing, in the order in which the instruction lines $LI_j$ of this basic block are stored in the memory 4, the instructions coded by each of these instruction lines.

For each of the instruction lines $LI_j$ to be executed of the machine code 32, the microprocessor 2 executes the following steps.

In a step 164, the microprocessor 2 loads, in a register of the set 12, the instruction line stored at the address $@_j$ contained in the ordinal counter 26.

Next, the module 28 proceeds with a step 166 of securing the instruction coded in the instruction line loaded.

The operation of the step 166 is now described in the case of the line $LI_j$. More specifically, on the step 166, the module 28 successively performs the following operations.

In an operation 170, the module 28 checks to see if there is an error in the cryptogram $CI_j*$ or the code $MAC_j$ using the code $ECC_{Lj}$ contained in the line $LI_j$ loaded. For example, for that, the module 28 constructs, using a preprogrammed function and the cryptogram $CI_j*$ and the code $MAC_j$, a code $ECC_{Lj}'$. If the code $ECC_{Lj}'$ is different from the code $ECC_{Lj}$, then an error is detected. If an error is detected, the module 28 proceeds immediately with a step 172.

In the step 172, the module 28 triggers the signalling of an execution fault.

Here, in parallel with the step 172, if an error is detected, the module 28 proceeds with the operation 174. In the operation 174, it corrects the cryptogram $CI_j*$ and the code $MAC_j$ from the information contained in the code $ECC_{Lj}$. At the end of the step 174, the corrected cryptogram $CI_j*$ and the corrected code $MAC_j$ are used instead, respectively, of the cryptogram $CI_j*$ and of the code $MAC_j$ contained in the line $LI_j$.

The operation 170 makes it possible notably to detect and correct faults introduced in the instruction lines stored in the memory 4.

At the end of the operation 174 or if no error has been detected in the operation 170, the method continues with an operation 176.

In the operation 176, the module 28 checks the integrity and the authenticity of the cryptogram $CI_j*$ using the code $MAC_j$. For example, for that, the module 28 constructs a label of the cryptogram $CI_j*$ then encrypts this label with the key k' contained in its memory 29. If the cryptogram thus constructed is identical to the code $MAC_j$ loaded, the integrity and the authenticity of the cryptogram $CI_j*$ is confirmed. In this case, the module 28 proceeds with an operation 178. Otherwise, the module 28 proceeds with the step 172.

The operation 176 makes it possible on the one hand to validate the authenticity of the code line loaded and also to validate that, in the operation 174, the cryptogram $CI_j*$ and/or the code $MAC_j$ has or have been correctly corrected. The verification of the authenticity prevents the replacement of the code line with another code line by an author who does not know the key k'.

In the operation 178, the module 28 decrypts the cryptogram $CI_j*$ by using the key ka and the initialization vector $iv_k$ to obtain the instruction $I_j$ and the code $ECC_{Ij}$ that have been decrypted. The key ka was stored in the memory 29 in the step 162. The vector $iv_k$ necessary to decrypt the cryptogram $CI_j*$ was stored in the registers $iv_{msbi}$, $iv_{ctei}$ and $iv_{lsbi}$ upon the execution of the instruction "Branch @xx" or "BranchIV rd" or "BranchIV ra" coded in the basic block preceding that which contains this line $LI_j$ currently being processed. If the line $LI_j$ is contained in the first basic block of the machine code 32, it is the initial values of the registers $iv_{msbi}$, $iv_{ctei}$ and $iv_{lsbi}$ which are used.

Here, it is the execution of the branch instruction "Branch @xx" or "BranchIV rd" or "BranchIV ra", by the unit 10, which indicates to the module 28 that it must replace the content of the register $iv_{lsbi}$ with the content of the register $iv_{branch}$. The content of the register $iv_{branch}$ is updated upon the execution of the instruction "Load $iv_{xx}$" or "LoadIV rd" or "LoadIV ra" which precedes the branch instruction.

Next, in an operation 180, the module 28 stores the decrypted instruction $I_j$ and the decrypted code $ECC_{Ij}$ in the queue 22.

Once the unit 10 has executed all the instructions which precede the instruction $I_j$ in the queue 22, that is to say when the instruction $I_j$ is the next instruction to be executed by the unit 10, the module 28 proceeds with an operation 184.

In the operation 184, the module 28 checks to see if there is an error in the instruction $I_j$ contained in the queue 22 using the code $ECC_{Ij}$ associated with the instruction $I_j$ and contained in this same queue 22. This operation is performed in a way similar to what was described for the operation 170.

If the module 28 detects an error, then it proceeds immediately with the step 172. Furthermore, in parallel, in an operation 186, the module 28 corrects the instruction $I_j$ using the code $ECC_{I_j}$. The operation 186 is similar to the operation 174.

Next, at the end of the operation 186 or if no error has been detected in the operation 184, the step 166 is ended and the method continues with a step 190 of execution of the instruction $I_j$ by the unit 10.

In the step 190, the unit 10 executes the instruction $I_j$.

As represented in FIG. 7, in parallel with the step 190, the method can comprise:

a step 198 of securing the execution stack 46, and/or
a step 250 of securing the data being processed.

The steps 198 and 250 are described in more detail in the following chapters.

The operation 184 makes it possible to detect a modification of the instruction $I_j$ which would occur between the instant at which it is stored in the queue 22 and the instant at which it is executed by the unit 10.

The operation 184 also makes it possible to trigger an execution fault if the control flow of the machine code 32 has been modified. In fact, a modification of the control flow is reflected by the fact that, after the execution of the basic block $BB_{k-1}$, it is not the basic block $BB_k$ which is executed but another basic block $BB_t$. In this case, upon the execution of the bloc $BB_{k-1}$, the initialization vector $iv_{k-1}$ is loaded in the registers $iv_{msbi}$, $iv_{ctei}$ and $iv_{lsbi}$. Consequently, upon the execution of the block $BB_t$, the cryptogram $CI_j^*$ is decrypted using the vector $iv_k$ which corresponds to $BB_k$ and not using the vector $iv_t$ which corresponds to the block $BB_t$. Consequently, the decryption of the cryptogram $CI_j^*$ using the vector $iv_k$ causes an instruction $I_j$ and a code $ECC_{I_j}$ that are incorrect to be obtained and this is detected in the operation 184. The operation 184 makes it possible to detect a disruption in the execution both of the operation "Branch @XX" and of the operation "BranchIV ra" or "BranchIV rd".

The operation 184 also makes it possible to detect the swapping, in the memory 4, of the two basic blocks $BB_k$ and $BB_t$ of the second type. In fact, if the bloc $BB_k$ is replaced by the block $BB_t$, then, upon the execution of the instruction "LoadIV ra" of the block $BB_{k-1}$, the first datum line of the block $BB_t$ is decrypted using a vector $iv_j$ constructed from the address $@_k$ and not from the address $@_t$. That therefore leads to an incorrect decryption of the cryptogram $iv_{lsbi}^*$ and therefore to an incorrect decryption of the first instruction line of the block $BB_t$. This incorrect decryption of the first instruction line of the block $BB_t$ is detected in the operation 184.

Upon the execution of the machine code 32, if attacks lead to the alteration of an instruction to be protected or to the modification of the control flow, the microprocessor 2 signals, in the step 172, a fault in the execution of the machine code 32. In response to such signalling, in a step 192, the microprocessor 2 implements one or more countermeasures. Very many countermeasures are possible. The countermeasures implemented can have very different degrees of severity. For example, the countermeasures implemented can range from a simple display or a simple storage of an error message without interrupting the normal execution of the machine code 32 to a definitive disabling of the microprocessor 2. The microprocessor 2 is considered to be out of service when it is definitively placed in a state in which it is incapable of executing any machine code. Between these extreme degrees of severity, there are many other possible countermeasures such as:

indication via a human-machine interface of the detection of the faults, immediate interruption of the execution of the machine code 32 and/or its reinitialization, and the deletion of the machine code 32 from the memory 4 and/or the deletion of the backup copy 40 and/or the deletion of the secret data.

Furthermore, here, the countermeasure implemented in the step 192 can be selected as a function of the error detected and therefore as a function of the operation which has led to the detection of this fault. For example, the countermeasure selected will not be the same depending on whether the error was detected in the operation 176 or 184.

CHAPTER IV: SECURING OF THE DATA OF THE EXECUTION STACK

Each time a calling function triggers the execution of a called function, the execution context of the calling function is backed up in the stack 46. Furthermore, the called function backs up, also in the stack 46, data such as local variables.

In a way similar to what was described in the case of the instructions $I_j$, a datum $D_j$ stored in the stack 46 can be corrupted by the implementation of buffer overflow attacks or by other types of attacks such as a fault injection attack.

To make the stack 46 more robust to such attacks, here, each datum $D_j$ stored in the stack 46 is coded in a respective line $LD_j$. The line $LD_j$ is a datum line. Contrary to the instruction lines $LI_j$ described in chapter III, the line $LD_j$ codes a datum $D_j$ to be processed by the microprocessor and not an instruction $I_j$ that is executable by the unit 10.

Figure 8:
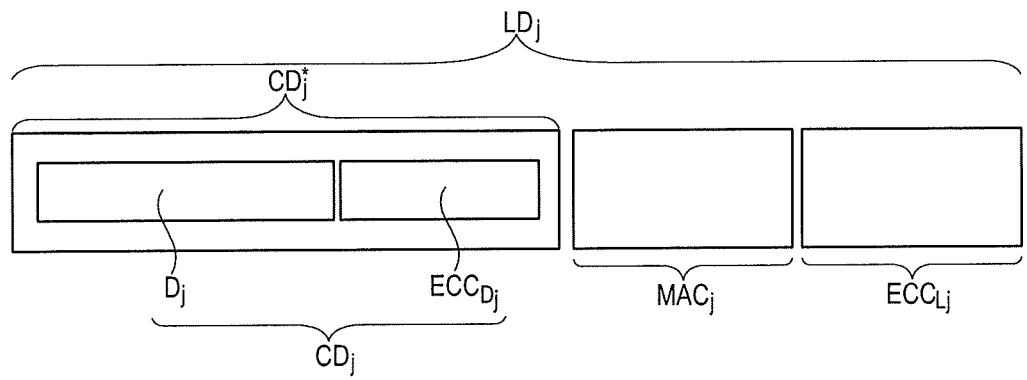
FIG. 8 is a schematic illustration of the structure of a data line of the binary code executed by the device of FIG. 1.

The structure of a line $LD_j$ is represented in FIG. 8. Here, the structure of the line $LD_j$ is identical to the structure of the line $LI_j$ except that the cryptogram $CI_j^*$ is replaced by a cryptogram $CD_j^*$. Given that the codes $MAC_j$ and $ECC_{L_j}$ of the line $LD_j$ are calculated as already described in the case of the lines $LI_j$, they are here designated by the same symbols and are not described again.

The cryptogram $CD_j^*$ is obtained by encrypting with the function $f_{ka}$, a concatenation $CD_j$. Here, the function $f_{ka}$ is the same as that already described in the case of the lines $LI_j$. Thus, the cryptogram $CD_j^*$ is obtained using the following relationship: $CD_j^* = f_{ka}(CD_j; iv_p)$. The function $f_{ka}$ is preprogrammed in the module 28.

In a way similar to what was described for the vector $iv_k$, the vector $iv_p$ is coded on 128 bits. The 32 most significant bits are stored in a register $Iv_{pile}$ of the microprocessor 2. The 32 least significant bits are stored in a register $iv_{lsbp}$ of the microprocessor 2. The 64 bits situated between the 32 two least significant bits and the 32 most significant bits are stored in one or more registers of the microprocessor 2, collectively designated by the term "register $iv_{ctep}$". Each vector $iv_p$ is therefore the result of the concatenation of the bits of the registers $iv_{pile}$, $iv_{ctep}$ and $iv_{lsbp}$. Here, the content of the register $iv_{ctep}$ is constant throughout the execution of the machine code. For example, the register $iv_{ctep}$ is loaded with this constant value at the start of the execution of the machine code 32. Here, the value contained in the register $iv_{ctep}$ is obtained by decrypting the cryptogram $iv_{ctep}^*$ of the block 34. For example, the register $iv_{ctep}$ is loaded at the start of the execution of the code 32 with a constant value different from those contained in the registers $iv_{ctei}$ and $iv_{cted}$.

The content of the register $iv_{lsbp}$, used in the encryption of the data, is a function of the address $@_j$ where the line $LD_j$ containing this datum is stored. To this end, the module 28 uses the function $F_{iv}$ previously described. There is therefore the following relationship: $iv_{lsbp}=F_{iv}(@_j)$, in which $iv_{lsbp}$ designates the content of the register $iv_{lsbp}$.

The concatenation $CD_j$ is the concatenation of the data $D_j$ and of a code $ECC_{Dj}$. The code $ECC_{Dj}$ makes it possible to detect and correct an error in the datum $D_j$. It is typically constructed as described for the code $ECC_{Ij}$.

The cryptogram $CD_j^*$ differs from the cryptogram $CI_j^*$ in that the initialization vector $iv_p$ used in the encryption of the concatenation $CD_j$ changes as a function of the address of the line $LD_j$ and also each time a new function stores data in the stack 46.

Figure 9:
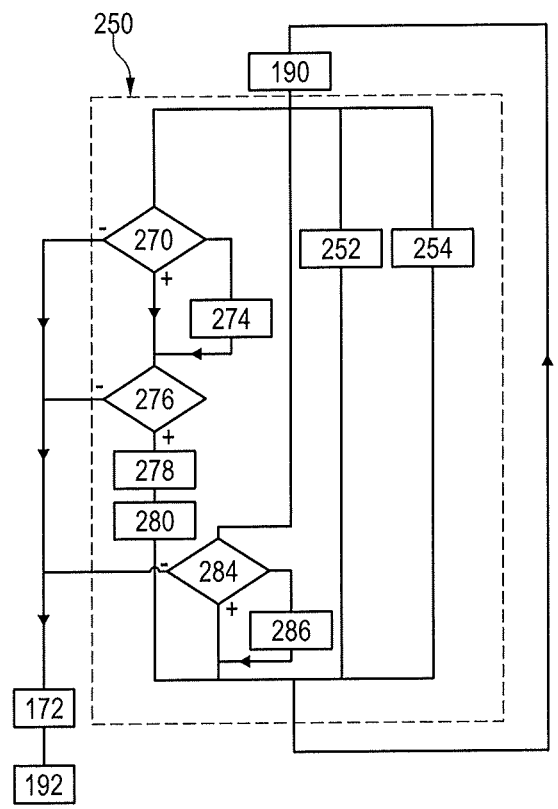
FIG. 9 is a flow diagram of a detail of a step of the method of FIG. 7 implemented to secure the data stored in an execution stack of the device of FIG. 1.

The securing of the data $D_j$ backed up in the stack 46 will now be described in more detail with reference to the method of FIG. 9 and in the particular case where it is implemented in combination with the teachings of the other chapters. More specifically, the securing of the data $D_j$ takes place each time the instruction executed in the step 190 is an instruction to read or write a datum $D_j$ in the stack 46. The method of FIG. 9 represents the operations executed in the step 198 to secure the data $D_j$.

Each time that, in the step 190, the unit 10 executes an instruction that leads to a new datum $D_j$ being stored in a register, here denoted $R_j$, of the set 12, in an operation 252, the module 28 calculates the code $ECC_{Dj}$ from the datum $D_j$. This calculated code $ECC_{Dj}$ is then concatenated with the datum $D_j$ in the register $R_j$.

Subsequently, upon a new execution of the step 190, the unit 10 executes an instruction to store the datum $D_j$ contained in the register $R_j$ at the address $@_j$ of the stack 46.

In response, in an operation 254, the module 28 constructs the code line $LD_j$ which must be stored at the address $@_j$ from the datum $D_j$. For that, in this operation, the module 28:

updates the content of the register $iv_{lsbp}$ using the relationship $iv_{lsbp}=F_{iv}(@_j)$, then encrypts the concatenation $CD_j$ of the datum $D_j$ and of the code $ECC_{Dj}$ using the function $f_{ka}$ and of the initialization vector $iv_p$ by using the following relationship: $CD_j^*=f_{ka}(CD_j; iv_p)$, then calculates the code $MAC_j$ from the cryptogram $CD_j^*$, then calculates the code $ECC_{Lj}$ from the cryptogram $CD_j^*$ and from the code $MAC_j$ calculated.

Next, the constructed line $LD_j$ is transferred and stored in the stack 46 at the address $@_j$.

If the next instruction to be executed in the step 190 is an instruction to load a line $LD_j$, then, the unit 10 executes this instruction and the line $LD_j$ is loaded in a register of the microprocessor 2. Typically, this load instruction comprises an operand which indicates the address $@_j$ where the line $LD_j$ to be loaded is located. Here, when the unit 10 executes this load instruction, it loads the line $LD_j$ in a register $R_j$ of the set 12 for example.

Next, the module 28 executes operations 270, 274, 276 and 278 that are identical, respectively, to the operations 170, 174, 176 and 178 of the method of FIG. 7, except that it is the corresponding codes contained in the line $LD_j$ which are used and not those contained in a line $LI_j$.

Furthermore, in the operation 278, the module 28 updates the content of the register $iv_{lsbp}$ necessary for decrypting the cryptogram $CD_j^*$ from the address $@_j$ and using the relationship $iv_{lsbp}=F_{iv}(@_j)$.

Once the cryptogram $CD_j^*$ has been decrypted, in an operation 280, the module 28 stores the decrypted datum $D_j$ and the decrypted code $ECC_{Dj}$ in the register $R_j$ pending the processing of this datum by the unit 10.

When the next instruction which will be executed by the unit 10 is an instruction which processes the datum $D_j$, the module 28 proceeds with operations 284 and 286. The module 28 identifies that the next instruction to be executed will process the datum $D_j$ because this instruction generally comprises an operand which identifies the register $R_j$ in which the datum $D_j$ is stored. The operations 284 and 286 are, for example, identical, respectively, to the operations 184 and 186 of the method of FIG. 7, except that here, it is the datum $D_j$ and the code $ECC_{Dj}$ which are used and not the $I_j$ instruction and the code $ECC_{Ij}$.

Next, at the end of the operation 286 or if no error has been detected in the operation 284, the unit 10 executes the instruction which processes the datum $D_j$.

The method for securing data described here also presents the same advantages as those presented in chapter III, notably because of the fact that the structure of the line $LD_j$ is practically identical to that of the line $LI_j$.

Furthermore, the fact of the datum $D_j$ being encrypted using an initialization vector $iv_{lsbp}$ which depends on the address $@_j$ makes it possible to detect whether a line $LD_j$ has been moved within the stack 46. Indeed, if two lines $LD_1$ and $LD_2$ are swapped, such a swapping of the lines $LD_1$ and $LD_2$ is not necessarily detected in the operation 270 or 276. By contrast, since the datum $D_1$ is encrypted with an initialization vector $iv_1$ which depends on the address $@_1$, if the line $LD_1$ is moved and is situated at an address $@_2$ in the stack 46, upon the loading of this line from this address $@_2$, the cryptogram $CD_1^*$ will be decrypted using the initialization vector $iv_2$ and not using the vector $iv_1$. Such an incorrect decryption of the datum $D_1$ and of the code $ECC_{D1}$ is then detected in the operation 284.

CHAPTER V: SECURING AGAINST BUFFER OVERFLOW ATTACKS

As already explained with reference to FIG. 5 in the case of the RISV-V instruction set, when the function $F_2$ is called from the function $F_1$, the return address @ra2 to be used to continue the execution of the function $F_1$ after the execution of the function $F_2$ is stored in a register ra of the set 12. By contrast, if, during the execution of the function $F_2$, a function $F_3$ is called, then, at that moment, the address @ra2 and, more generally, the execution context of the function $F_2$, is backed up in the stack 46.

The execution context notably comprises all the information necessary to the resumption of the execution of the function $F_2$ once the execution of the function $F_3$ is finished. That comprises, in addition:

the address @ra2, the value of a pointer sp which points to the top of the stack 46, possibly, the values of certain data currently being processed by the function $F_2$.

Upon its execution, the function $F_3$ can also back up data in the stack 46, in a predetermined space of the memory called "buffer". It is possible to write into this buffer data that are larger than the space allotted to this buffer to back up these data. That leads to what is known as "buffer overflow" or "buffer overrun".

When this buffer overflow is intentional, it can be used to replace the address @ra2 with another address @rat chosen by a hacker. In these conditions, at the end of the execution of the functions $F_2$ and $F_3$, it is not the execution of the function $F_1$ which is continued, but the execution of the instructions situated at the start address @rat. A buffer overflow can therefore be used to divert the control flow to a code developed and designed by a hacker. Typically, this kind of attack is implemented to circumvent security measures and/or obtain secret information on the operation of the secured function.

In this chapter, a solution for fighting against this type of attack is described. Here, this solution is described in the particular case where the teaching of the other chapters, and in particular of the Chapter IV, is, at the same time, implemented.

More specifically, to render buffer overflow attacks more difficult, the vector $iv_p$ used to encrypt the return address @ra2 backed up in the stack 46 is different from that used in the backing up of data in the stack 46 by the called function $F_3$.

Figure 10:
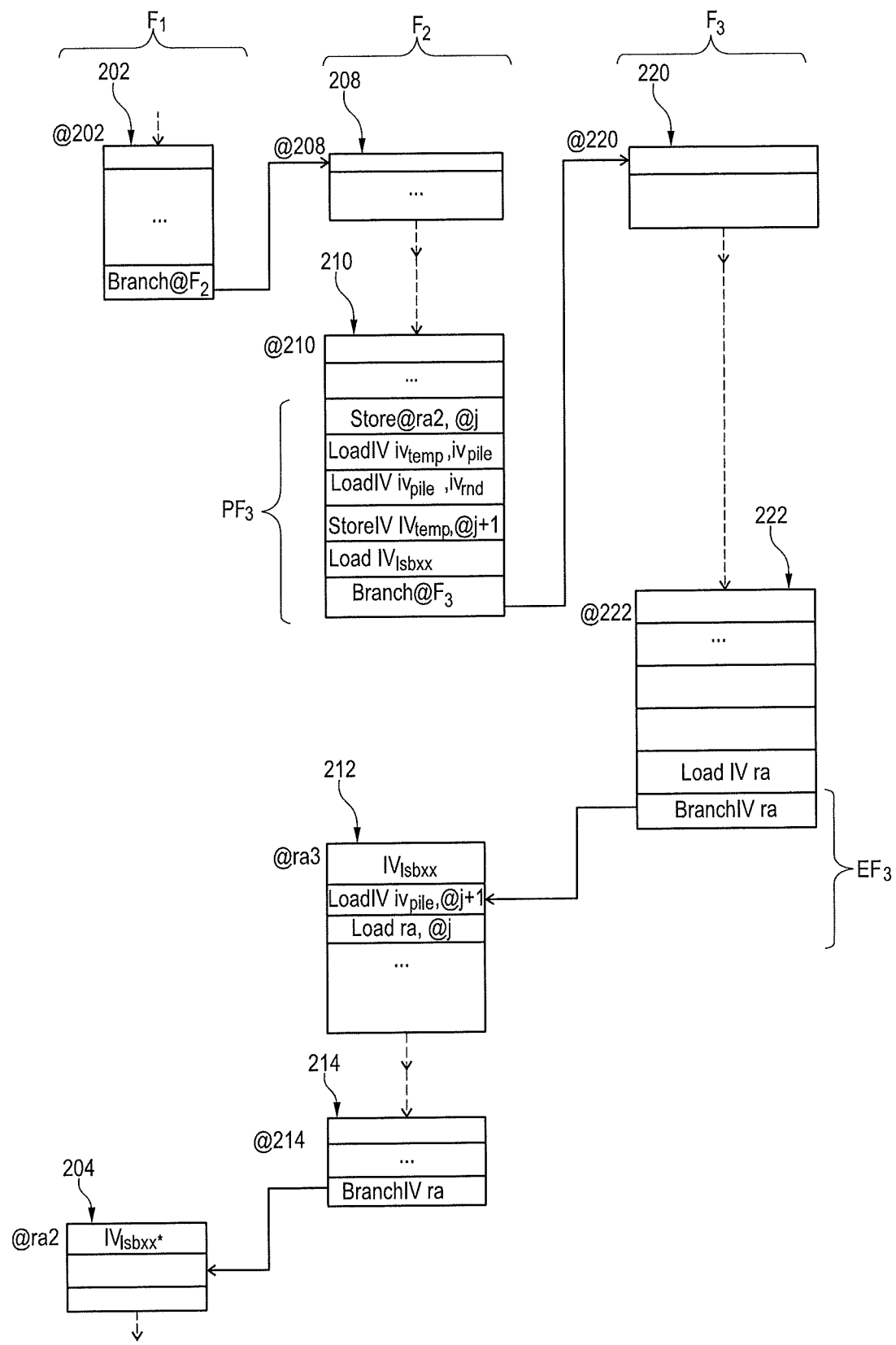
FIG. 10 is schematic illustrations of different portions of the binary code of the secured function likely to be executed by the device of FIG. 1.

To this end, the prologue $PF_3$ and the epilogue $EF_3$ of the call to the function $F_3$ are modified as represented in FIG. 10.

FIG. 10 is divided into three vertical columns designated by the references $F_1$, $F_2$ and $F_3$. The basic blocks of the functions $F_1$, $F_2$ and $F_3$ are represented, respectively, in the columns $F_1$, $F_2$ and $F_3$.

The instruction lines of the basic blocks of the functions $F_1$, $F_2$ and $F_3$ are secured as described in Chapter III. Consequently, the basic blocks of the functions $F_1$, $F_2$ and $F_3$ are either basic blocks of the first type or basic blocks of the second type as previously described.

The function $F_1$ comprises a basic block 202 and a basic block 204. The block 202 is, here, a basic block of the first type. The basic block 202 ends with an instruction line coding a branch instruction, denoted "Branch $@F_2$" in FIG. 10, to the first instruction line of the first basic block 208 of the function $F_2$. It is recalled here that when the instruction denoted "Branch $@F_2$" is executed, the return address @ra2 is stored in the register ra of the set 12.

The basic block 204 is the basic block of the function $F_1$ which has to be executed when the execution of the function $F_2$ is finished. Its first line is therefore situated at the address @ra2. Here, the execution of the basic block 204 is triggered following the execution of an indirect branch instruction situated at the end of the function $F_2$. Consequently, here, the basic block 204 is a basic block of the second type.

The function $F_2$ begins with the basic block 28 and ends with a basic block 214. Here, these basic blocks 208 and 214 are basic blocks of the first type.

Between these blocks 208 and 214, the function $F_2$ comprises a basic block 210 and a basic block 212. The basic block 210 comprises instruction lines of the prologue $PF_3$ which is executed by the microprocessor 2 before the start of the execution of the first basic block 220 of the function $F_3$.

The last instruction line of the prologue $PF_3$ codes a direct branch instruction, denoted "Branch $@F_3$", to the first instruction line of the block 220. Upon the execution of this instruction, the return address @ra3 of the function $F_3$ is stored in the register ra. Consequently, the address @ra2 which was in this register ra must first be backed up in the stack 46. To this end, the prologue $PF_3$ comprises an instruction line denoted "Store @ra2, $@_j$" which, when it is executed by the microprocessor 2, backs up the address @ra2 at the address $@_j$ in the stack 46. As explained in Chapter IV, it is therefore a line $LD_j$ containing a cryptogram $CD_j^*$ constructed from the address @ra2 which is backed up at the address $@_j$ in the stack 46.

It is recalled here that the cryptogram $CD_j^*$ is obtained by using the vector $iv_p$. This vector $iv_p$ is the result of the concatenation of the bits contained in the registers $iv_{pile}$, $iv_{ctep}$ and $iv_{lsbp}$. The content of the register $iv_{lsbp}$ is equal to $F_{iv}(@_j)$, in which $@_j$ is the address in the stack 46 where the datum must be backed up.

Consequently, $iv_a$ is used to denote the value contained in the register $iv_{pile}$ at the moment when the instruction "Store @ra2, $@_j$" is executed. Thus, the address @ra2 is encrypted using the value $iv_a$ contained in the register $iv_{pile}$ and using the address $@_j$.

Next, between the instructions "Store @ra2, $@_j$" and "Branch $@F_3$", the prologue $PF_3$ comprises instruction lines coding instructions to:

back up the value $iv_a$ in the stack 46, and replace the value $iv_a$ of the register $iv_{pile}$ with a new value $iv_b$.

To this end, the prologue $PF_3$ comprises, in succession:

an instruction line coding an instruction denoted "LoadIV $iv_{temp}$, $iv_{pile}$", an instruction line coding an instruction denoted "LoadIV $iv_{pile}$, $iv_{rnd}$", and an instruction line coding an instruction denoted "StoreIV $iv_{temp}$, $@_{j+1}$", When it is executed by the microprocessor 2, the instruction "LoadIV $iv_{temp}$, $iv_{pile}$" provokes the storage of the content of the register $iv_{pile}$ in the register $iv_{temp}$. Thus, after the execution of this instruction, the value $iv_a$ is backed up in the register $iv_{temp}$.

When it is executed by the microprocessor 2, the instruction "LoadIV $iv_{pile}$, $iv_{rnd}$" provokes the storage in the register $iv_{pile}$ of the content of the register $iv_{rnd}$.

The register $iv_{rnd}$ is, here, a register which is connected to a random or pseudo-random number generator. Thus, each time its content is read or loaded in another register, the register $iv_{rnd}$ contains a new value constructed by the random or pseudo-random number generator.

Thus, after the execution of the instruction "LoadIV $iv_{pile}$, $iv_{rnd}$", the register $iv_{pile}$ contains the new value $iv_b$ and this new value $iv_b$ has been generated randomly or pseudo-randomly.

When the instruction "StoreIV $iv_{temp}$, $@_{j+1}$" is executed by the microprocessor 2, it provokes the backup of the value $iv_a$ contained in the register $iv_{temp}$ in the stack 46 at the address denoted $@_{j+1}$. For example, the address $@_{j+1}$ is the address which immediately follows the address $@_j$ in the stack 46. Since the instruction "StoreIV $iv_{temp}$, $@_{j+1}$" is executed after the instruction "LoadIV $iv_{pile}$, $iv_{rnd}$", the value $iv_a$ is encrypted by using the new value $iv_b$ contained in the register $iv_{pile}$.

Finally, as already described in Chapter III, the prologue $PF_3$ also comprises an instruction line coding the instruction "Load $IV_{lsbxx}$" to load in the register $iv_{branch}$ the value which will be used to decrypt the instructions $I_j$ of the following basic block, that is to say, here, of the basic block 220 of the function $F_3$.

The block 212 is the basic block of the function $F_2$ executed just after the execution of the function $F_3$. Since the execution of the basic block is triggered following the execution of an indirect branch, the block 212 is, here, a basic block of the second type.

The first basic block 220 of the function $F_3$ is a basic block of the first type.

The function $F_3$ ends with a basic block 222 of the first type which comprises a first part of the epilogue $EF_3$. This first part $EF_3$ ends with an instruction line coding an instruction "BranchIV ra". When the instruction "BranchIV ra" is executed by the microprocessor 2, that provokes a jump to the second line of the basic block 212. For that, it is preceded by an instruction line comprising the instruction "LoadIV ra". These instructions have already been explained in Chapter III.

The epilogue $EF_3$ also comprises a second part which begins at the first instruction line of the block 212. This second part of the epilogue $EF_3$ comprises, in succession:

an instruction line coding an instruction "LoadIV $iv_{pile}$, $@_{j+1}$", then an instruction line coding an instruction "Load ra, $@_j$".

The execution of the instruction "LoadIV $iv_{pile}$, $@_{j+1}$" by the microprocessor 2 provokes the decryption and the loading in the register $iv_{pile}$ of the datum contained in the data line situated at the address $@_{j+1}$. As explained above, upon the execution of the prologue $PF_3$, it is the cryptogram of the value $iv_a$ encrypted by using the value $iv_b$ which is backed up in this line. Thus, the execution of the instruction "LoadIV $iv_{pile}$, $@_{j+1}$" provokes the replacement of the value $iv_b$ contained in the register $iv_{pile}$ by the value $iv_a$ backed up in the stack 46.

The execution of the instruction "Load ra, $@_j$" provokes the decryption and the loading in the register ra of the datum contained in the datum line situated at the address $@_j$. As explained above, upon the execution of the prologue $PF_3$, it is the cryptogram of the address @ra2 encrypted by using the value $iv_a$ which is backed up in this line. Thus, the execution of the instruction "Load ra, $@_j$" provokes the decryption and the loading in the register ra of the datum contained in this line.

The operation of the method to secure the stack 46 against buffer overflow attacks will now be described in more detail with reference to FIGS. 11 and 12 in the particular case of the functions $F_1$, $F_2$ and $F_3$ previously described. The instructions of the functions $F_1$, $F_2$ and $F_3$ are executed in accordance with what was described in Chapter III. It is also assumed that the function $F_1$ is the main function, specifically referred to as "main", of the machine code 32.

In a step 230, during the execution of the function $F_1$, the block 202 is executed to call the function $F_2$. Upon the execution of the block 202, the prologue of the call to the function $F_2$ is executed. The execution of this prologue provokes the loading of the address @ra2 in the register ra of the microprocessor 2. It also provokes the backup of at least a part of the execution context of the function $F_1$ in the stack 46. Next, the instruction "Branch $@F_2$" is executed, which provokes a jump to the first instruction line of the function $F_2$ situated at the address @208.

In a step 232, the function $F_2$ is executed. Upon its execution, the function $F_2$ backs up data $DF_2$ in the stack 46 (FIG. 12) such as, for example, local variables. Each time a datum is backed up in the stack 46, the method of Chapter IV is implemented. Upon the execution of the function $F_2$, the register $iv_{pile}$ contains the value $iv_a$.

In a step 234, during the execution of the function $F_2$, the block 210 is executed. The prologue $PF_3$ of the call to the function $F_3$ is then executed by the microprocessor 2.

In the step 234, the operations conventionally executed upon the execution of a prologue of a call to a function are carried out. Since these operations are conventional, they are not taken up again here. It is simply recalled that the execution of these operations provokes the backup of the different data of the execution context of the function $F_2$ in the stack 46. These data comprise, for example, the value of a pointer sp which points to the top of the stack 46 and other information necessary to correctly resume the execution of the function $F_2$ after the execution of the function $F_3$. Furthermore, the execution of the prologue $PF_3$ leads to the instruction lines represented in FIG. 10 being executed one after the other. The execution of these instruction lines by the microprocessor 2 provokes, in order:

the backup of the address @ra2 at the top of the stack 46, then the backup of the current value $iv_a$ of the register $iv_{pile}$ in the register $iv_{temp}$, then the loading of the new value $iv_b$ in the register $iv_{pile}$, then the backup of the value $iv_a$ contained in the register $iv_{temp}$ in the stack 46, then the loading of a new value in the register $iv_{lsbi}$ making it possible to decrypt the instruction lines $LI_j$ of the block 220, then the execution of the first instruction line of the block 220.

The address @ra2 is backed up in the stack 46 like all the other data backed up in its stack, that is to say by implementing the method of Chapter IV. The address @ra2 is backed up in the stack 46 at a moment when the value contained in the register $iv_{pile}$ is equal to the value $iv_a$. Consequently, it is only a cryptogram @ra2* obtained by encrypting the address @ra2 using the value $iv_a$ which is stored in the stack 46. In FIG. 12, this cryptogram is denoted "@ra2*". Similarly, the value $iv_a$ is backed up in the stack 46 by implementing the method of Chapter IV. At the moment when the value $iv_a$ is backed up, the register $iv_{pile}$ contains the value $iv_b$. Thus, the cryptogram $iv_a$* of the value $iv_a$ backed up in the stack 46 is obtained by encrypting the value $iv_a$ using the value $iv_b$.

In a step 236, after the execution of the prologue $PF_3$, the function $F_3$ is executed. Upon its execution, the function $F_3$ stores data $DF_3$ in the stack 46 by implementing the method of Chapter IV. Here, the function $F_3$ is a leaf function, that is to say a function which does not call another function during its execution. In these conditions, the content of the register $iv_{pile}$ is left unchanged between the execution of the prologue $PF_3$ and the execution of the epilogue $EF_3$. Thus, each datum backed up in the stack 46 by the function $F_3$ is encrypted using the value $iv_b$ which is different from the value $iv_a$.

In a step 238, when the execution of the function $F_3$ ends, the epilogue $EF_3$ is executed. The execution of the epilogue $EF_3$ provokes, in addition to the execution of the conventional operations of an epilogue:

1) the decryption of the cryptogram $iv_{lsbxx}$* contained in the first data line of the block 212 and the loading of the decrypted value in the register $iv_{lsbi}$ (execution of the instruction "Load IV ra"), then 2) a jump to the first instruction line of the block 212 (execution of the instruction "BranchIV ra"), then 3) the replacement of the value $iv_b$ contained in the register $iv_{pile}$ by the value $iv_a$ (execution of the instruction "LoadIV $iv_{pile}$, $@_{j+1}$"), then 4) the loading from the stack 46 of the address @ra2 in the register ra (execution of the operation "Load ra, $@_j$").

The above operations 1) and 2) have already been described in detail in Chapter III.

In the operation 3) above, the cryptogram $iv_a$* is read in the stack 46 then decrypted using the value contained in the register $iv_{pile}$, that is to say using the value $iv_b$.

In the operation 4) above, the cryptogram @ra2* is read in the stack 46 and decrypted using the current value contained in the register $iv_{pile}$, that is to say at this stage, using the value $iv_a$.

Next, in a step 240, the execution of the function $F_2$ is continued by using the value $iv_a$ contained in the register $iv_{pile}$ to decrypt and encrypt the data $DF_2$ backed up in the stack 46.

In a step 242, when the execution of the function $F_2$ has ended, the execution of the function $F_1$ resumes. For that, the branch to the address @ra2 contained in the register ra is executed. Here, the switchover from the execution of the function $F_1$ to the function $F_2$, then the return from the execution of the function $F_2$ to the function $F_1$ are implemented as described in detail in the case of the functions $F_2$ and $F_3$.

If a buffer overflow attack is implemented by forcing the function $F_3$ to store a datum which exceeds the size allotted to back up the data $DF_3$, then the cryptogram @ra2* can be replaced by another cryptogram denoted @rat*. Since the replacement of the cryptogram @ra2* by the cryptogram @rat* occurs during the execution of the function $F_3$, the cryptogram @rat* is the result of the encryption of an address @rat using the value $iv_b$ currently contained in the register $iv_{pile}$.

Upon the execution of the epilogue $EF_3$, the cryptogram @rat* is decrypted using the value $iv_a$ and not using the value $iv_b$. Consequently, the decrypted return address is different from the address @rat. The hacker cannot therefore choose the address to which the control flow is diverted.

Finally, in this embodiment which also implements what was described in Chapter IV, the hacker does not know the keys ka and k'. He or she cannot therefore correctly construct a code $MAC_j$ and the cryptogram $CD_j$* corresponding to the address @rat. Thus, if the datum line containing the cryptogram @ra2* is replaced by a datum line containing the cryptogram @rat*, such a replacement is detected in the verification operations 270 and 276. Thus, an execution error is detected before the execution of the block 214.

CHAPTER VI: SECURING THE DATA

The binary code 30, in addition to the machine code 32, can comprise data to be processed upon the execution of the machine code 32. Furthermore, upon the execution of the machine code 32, the latter can generate data. These data are typically contained in the part 44 of the memory 4.

What was described in Chapter IV for securing the data backed up in the stack 46 is, preferably, also implemented for securing the data stored in the part 44. In particular, each datum stored in the part 44 is coded in a line $LD_j$ whose structure is identical to what was described in the case of the stack 46. Consequently, the writing and the reading of a datum in the part 44 are performed as described in Chapter IV except that the term "stack 46" is replaced by the term "part 44".

CHAPTER VII: GENERATION OF THE BINARY CODE

FIG. 13 represents a compiler 300 capable of automatically generating the binary code 30 from a source code 302. To this end, the compiler 300 typically comprises a programmable microprocessor 304 and a memory 306. The memory 306 contains the instructions and the data necessary to, when they are executed by the microprocessor 304, automatically generate the binary code 30 from the source code 302. In particular, upon the compilation of the source code 302, the microprocessor 304 automatically generates the appropriate initialization vectors $iv_k$ and the code lines $LI_j$ and $LD_j$. Upon this compilation, the compiler 300 also automatically introduces into the machine code the instructions previously described for the implementation of the methods of FIGS. 7, 9 and 11. The design and the production of such a compiler are within the scope of the person skilled in the art based on the explanations given in this description. For example, for that, the compiler 30 marks and automatically identifies the branch instructions and, based on the identified branch instruction, automatically introduces before and/or after the instructions necessary to the implementation of the methods described here.

CHAPTER VIII: VARIANTS

Variants of the Device 1:

The memory 4 can also be a non-volatile memory. In this case, it is not necessary to copy the binary code 30 within this memory before launching its execution since it is already there.

As a variant, the memory 4 can also be an internal memory incorporated in the microprocessor 2. In this latter case, it is produced on the same substrate as the other elements of the microprocessor 2. Finally, in other configurations, the memory 4 is composed of several memories, some of which are internal memories and others are external memories.

The main memory 4 can comprise a first volatile memory of large capacity and a second volatile memory of smaller capacity but in which the read and write operations are faster. The second memory is known as "cache memory". The cache memory can be a memory external to the microprocessor 2 or an internal memory of the microprocessor 2. In some embodiments, several cache memories of different levels can be used.

Numerous different hardware architectures are possible for producing the module 28. In particular, the module 28 can be composed by the combination of several hardware blocks of the microprocessor 2 fulfilling respective functions and each situated in a different area of the chip of the microprocessor 2.

In another embodiment, the module 28 is replaced by a software module which, when it is executed by the unit 10, performs the same functions and operations as those described for the module 28.

Variants of the Securing of the Machine Code:

As a variant, only the structure of the second type described with reference to FIG. 5 is used for all the basic blocks of the machine code 32. In this case, what was previously described in the particular case of indirect branches is also implemented for the direct branches.

Other embodiments of the content of the first line of a block $BB_k$ of the second type are possible. For example, this content is not necessarily encrypted. In another variant, this content is encrypted by using a key other than the address $@_k$ of the first line. For example, the content of the first line is only encrypted with the key ka. The content of the first line can also contain, in place of the cryptogram $iv_{lsbi}$*, a cryptogram $@_{lsbi}$* of an address $@_{lsbi}$. In this case, when the instruction "LoadIV ra" or "LoadIV rd" is executed, it provokes the reading and the decryption of the cryptogram a $@_{lsbi}$* to obtain the address $@_{lsbi}$. Next, the content from which the 32 least significant bits of the vector $iv_k$ are constructed is read at the address $@_{lsbi}$.

Other embodiments are possible for constructing the vector $iv_k$ from the address $@_k$. For example, an association table is loaded in the memory 29 before or at the start of the execution of the code 32. This table associates, with each address $@_k$ of a block $BB_k$ of the second type, the content which makes it possible to construct the 32 least significant bits of the vector $iv_k$. For example, this content is identical to that described in the case where it is stored in the first line of the basic block of the second type. The operation of this embodiment is identical to that previously described except that the instruction "LoadIV ra" or "LoadIV rd" provokes, when it is executed by the microprocessor 2, the reading of the content of the register $iv_{lsbi}$ from the association table and not in the first line of the basic block $BB_k$. In this case, the basic blocks of the second type are replaced by basic blocks of the first type and the instruction "BranchIV rd" or "BranchIV ra" is modified to provoke a jump to the first line of the following basic block and not to the second line of this basic block.

Nor is it necessary to construct the vector $iv_k$ by using the contents of the registers $iv_{msbi}$ and $iv_{ctei}$. For example, as a variant, the contents of the register $iv_{msbi}$ and $iv_{ctei}$ are constructed from the content of the register $iv_{lsbi}$. For example, the vector $iv_k$ coded on 128 bits is obtained by concatenating the 32 bits of the register $iv_{lsbi}$ four times with themselves. In this case, the registers $iv_{msbi}$ and $iv_{ctei}$ can be omitted.

As a variant, some functions or parts of the binary code 30 are not secured. To manage the execution of such a binary code which comprises both a secured function and unsecured functions, the instruction set of the microprocessor 2 can be complemented with:

an instruction to activate a secured mode of operation of the microprocessor 2, and an instruction to deactivate this secured mode.

In this case, the instruction to activate the secured mode is located in the binary code 30 just before the call to the secured function and the instruction to deactivate the secured mode is located just after the end of the secured function. When the instruction to activate the secured mode is loaded by the microprocessor 2, in response, the module 28 begins to process the following instructions and data of the binary code as described in the preceding chapters. When the instruction to deactivate the secured mode is loaded by the microprocessor 2, in response, the module 28 is deactivated. In this latter case, the processing of the following instructions and data of the binary code are not processed by the module 28 but directly loaded in the queue 22 or in the registers of the set 12.

As a variant, an "update" instruction is added to the instruction set of the microprocessor. When this "update" instruction is executed by the microprocessor 2, it provokes the loading, in the register $iv_{lsbi}$, of the value currently contained in the register $iv_{branch}$. Consequently, in this case, the use of a new initialization vector $iv_k$ is triggered other than by the execution of a branch instruction. In this case, the method described can also be implemented with implicit branch instructions. In fact, the last instruction of a basic block which ends with an implicit branch instruction, is then the "update" instruction. Instead of implementing an "update" instruction as a separate instruction in the instruction set of the microprocessor, it is possible to add an additional bit to each instruction of the instruction set of the microprocessor 2 and to trigger the change of initialization vector $iv_k$ only when this additional bit takes a specific value.

The code $ECC_{Ij}$ can be replaced by a simple error detecting code allowing only the detection of an error in the instruction $I_j$ with which it is concatenated. An error detecting code does not make it possible to correct the detected error. In this case, the error correction operation 186 is omitted. Consequently, as soon as the module 28 detects an error in a decrypted instruction $I_j$ for example, the execution of the secured function is systematically interrupted.

In a simplified variant, the code $ECC_{Ij}$ is omitted. In this case, the cryptogram $CI_j^*$ is only the cryptogram of the instruction $I_j$. In this embodiment, the microprocessor 2 is no longer capable of detecting a modification of the instruction $I_j$ which might occur between the instant when the latter is stored in the queue 22 and the instant when it is executed by the unit 10.

The code $ECC_{Lj}$ can be replaced by a simple error detecting code. In this case, the correction operation 174 is omitted.

In another variant, the code $ECC_{Lj}$ is constructed so as to allow only the detection of an error, either only in the cryptogram $CI_j^*$ or only in the code $MAC_j$.

The code $ECC_{Lj}$ can be omitted. In this case, an error in the cryptogram $CI_j^*$ or in the code $MAC_j$ can be detected only upon the execution of the cryptogram integrity and authenticity verification operation 176. The detection of an error using a code MAC is generally more complex than using a simple error detecting code or a simple error correcting code. Furthermore, when the code $ECC_{Lj}$ is omitted, in the case where there is an error in the cryptogram $CI_j^*$ or the code $MAC_j$, it is not possible to correct this error. In this latter case, for example, the execution of the secured function is therefore systematically interrupted in the case of an error.

In another embodiment, it is the code $MAC_j$ which is omitted. The operation 176 is then also omitted.

Variants of the Securing of the Data:

The structure of the lines $LD_j$ used to secure the data backed up in the memory 4 can be modified. In particular, the different variants of the structure of a line $LI_j$ described above are applicable to the structure of the lines $LD_j$. When the structure of the line $LD_j$ is modified, the method of FIG. 9 must be adapted accordingly to take account of these modifications. For example, if the code $ECC_{Dj}$ is replaced by a simple error detecting code, then the error correction operation 286 is omitted. Consequently, as soon as the module 28 detects an error in a decrypted datum $D_j$, for example, the execution of the secured function is systematically interrupted.

As a variant, the function $F_{iv}$ is identical to the function $f_{ka}$ except that it is applied to the address $@_j$. The function $F_{iv}$ can also use the same encryption algorithm as the function $f_{ka}$ but with an encryption key different from the key ka.

In a simplified variant, the function $F_{iv}$ is the identity function. In this case, the contents of the registers $iv_{lsbd}$ and $iv_{lsbp}$ are systematically equal to the address $@_j$.

In other embodiments, to detect a movement of a line $LD_j$, the code $MAC_j$ is calculated as a function of the vector $iv_p$. For example, in the case of a datum line $LD_j$ backed up in the stack 46, the code $MAC_j$ is calculated from the concatenation of the cryptogram $CD_j^*$ and of the vector $iv_p$. The code $MAC_j$ can also be calculated from a combination of the cryptogram $CD_j^*$ and of the vector $iv_p$ such as the following combination: $CD_j^*$ XOR $iv_p$. In the case where the code $MAC_j$ depends on the vector $iv_p$, then it can be used in place of the code $ECC_{Dj}$ to detect an error in case of movement of the line $LD_j$ in the stack 46. In fact, in this case, in verifying the integrity and the authenticity of the cryptogram $CD_j^*$, the module 28:

obtains the vector $iv_p$ from the content of the registers $iv_{pile}$, $iv_{ctep}$ and $iv_{lsbp}$, then combines the cryptogram $CD_j^*$ with the vector $iv_p$ obtained, then verifies the integrity and the authenticity of this combination from the code $MAC_j$ contained in the same line $LD_j$. If this line $LD_j$ has been moved, the vector $iv_p$ obtained is different from that expected. Consequently, the integrity of the combination of the cryptogram $CD_j^*$ and of the vector $iv_p$ cannot be verified, which triggers the signalling of an execution fault. It will be noted that, in this embodiment, it is possible to detect a movement of the line $LD_j$ without even having to decrypt the cryptogram $CD_j^*$. In this variant, to detect a movement of the line $LD_j$, the code $ECC_{Dj}$ can be omitted.

In a way similar to what was described above for the code $MAC_j$, the code $ECC_{Lj}$ can also be constructed so as to depend on the vector $iv_p$. In this case, the movement of the line $LD_j$ is detected in the verifications of the code $ECC_{Lj}$. Consequently, to detect a movement of the line $LD_j$, the code $ECC_{Dj}$ can be omitted.

In the embodiments hitherto described, both the datum $D_j$ and the code $ECC_{Dj}$ are coded as a function of the vector $iv_p$ since the cryptogram $CD_j^*$ is encrypted using this vector $iv_p$. As a variant, either only the datum $D_j$ or only the code $ECC_{Dj}$ is coded as a function of the vector $iv_p$. For example, in the datum line, the cryptogram of the datum $D_j$ is obtained from an encryption function which does not use the vector $iv_p$, whereas the cryptogram $ECC_{Dj}^*$ of the code $ECC_{Dj}$ is obtained using the encryption function $f_{ka}(ECC_{Dj}; iv_p)$. In this case, in the operation 278, the module 28 decrypts the cryptogram of the datum $D_j$ without using the vector $iv_p$ and decrypts the cryptogram $ECC_{Dj}^*$ by using this vector $iv_p$. Next, the rest of the method is identical to what has already been described. In a simplified embodiment, since the datum $D_j$ does not need to be coded as a function of the vector $iv_p$, it is also possible not to encrypt it. For example, the code line then contains the datum $D_j$ in clear and the cryptogram $ECC_{Dj}^*$. Consequently, in the operation 278, the decryption of the datum $D_j$ is omitted since it simply has to be extracted from the range of bits in which it is contained in the line $LD_j$.

Conversely, it is also possible to modify the structure of the lines $LD_j$ so that only the datum $D_j$ is coded as a function of the vector $iv_p$. For example, the line $LD_j$ comprises a cryptogram $D_j^*$ of the datum $D_j$ obtained by encrypting it using the function $f_{ka}(D_j; iv_p)$ and a cryptogram $ECC_{Dj}^*$ obtained by encrypting the code $ECC_{Dj}$ using an encryption function that is independent of the vector $iv_p$. In the operation 270, the module 28 decrypts the cryptogram $ID_j^*$ using the vectors $iv_p$ and decrypts the cryptogram $ECC_{Dj}^*$ without using this vector $iv_p$.

Up to this point, it is the encryption function which has been described as an exemplary embodiment making it possible to code the datum $D_j$ or the code $ECC_{Dj}$ as a function of the vector $iv_p$. This encryption function can however be as simple as a simple logic "Exclusive OR" operation between the datum $D_j$ and the vector $iv_p$ or between the code $ECC_{Dj}$ and the vector $iv_p$.

All the variants described in the particular case of the securing of the data backed up in the stack 46 apply to the case of the securing of the data backed up elsewhere in the memory 4. In particular, these variants are applied to the datum line $LD_k$ of the basic blocks of the second type.

Variants of the Securing of the Execution Stack:

The securing of the stack 46 has been described in the particular case where the return address @ra2 is backed up in the stack only at the moment when the function $F_2$ calls the function $F_3$. However, what has been described applies also to the situations in which the return address @ra2 is backed up in the stack 46 at the moment when the function $F_2$ is called by the function $F_1$. In this case, what has been previously described applies likewise identically except that it is the prologue and the epilogue of the function $F_2$ which are modified.

The new value $iv_b$ contained in the register $iv_{pile}$ can be generated in many different ways. For example, the new value $iv_b$ is equal to the value $iv_a$ to which a predetermined increment has been added. In this case, the initial value contained in the register $iv_{pile}$ is for example a predefined value loaded on startup of the microprocessor 2.

There are other possibilities for encrypting the address @ra2 using an initialization vector different from that used to encrypt the data $DF_3$. For example, as a variant, the prologue $PF_3$ is modified to perform the following operations in order when it is executed by the microprocessor 2:

1) The value $iv_a$ contained in the register $iv_{pile}$ is backed up in a register $iv_{temp1}$.
2) The value $iv_a$ contained in the register $iv_{pile}$ is replaced by a new value $iv_b$ generated, for example, randomly as described previously.
3) The address @ra2 contained in the register ra is backed up in the stack 46. The cryptogram @ra2* stored in the stack 46 is therefore the result of the encryption of the address @ra2 using the value $iv_b$ currently contained in the register $iv_{pile}$.
4) The value $iv_b$ contained in the register $iv_{pile}$ is backed up in a register $iv_{temp2}$.
5) The value $iv_b$ contained in the register $iv_{pile}$ is replaced by the value $iv_a$ contained in the register $iv_{temp1}$.
6) The value $iv_b$ contained in the register $iv_{temp2}$ is backed up in the stack 46. The cryptogram $iv_b^*$ stored in the stack 46 is therefore the result of the encryption of the value $iv_b$ using the value $iv_a$ currently contained in the register $iv_{pile}$.

Next, during the execution of the function $F_3$, each time data are backed up in the stack 46, they are encrypted using the value $iv_a$ contained in the register $iv_{pile}$. This embodiment therefore provides a good way of encrypting the address @ra2 using an initialization vector different from that used to encrypt the data backed up in the stack 46 upon the execution of the function $F_3$. The operation of this embodiment is deduced from the explanations given with reference to FIGS. 10 to 12.

Other embodiments of the prologue $PF_3$ and of the epilogue $EF_3$ are possible. For example, through the use of additional temporary registers, the order of the operation can be modified. Thus, for example, the cryptogram $iv_a^*$ can be backed up in the stack 46 before the cryptogram @ra2*. For that, for example, it is necessary, in succession:

1) to back up the value $iv_a$ in a temporary register $iv_{temp3}$,
2) to generate and back up the value $iv_b$ in the register $iv_{pile}$,
3) to back up in the stack 46 the content of the register $iv_{temp3}$,
4) to back up the value $iv_b$ in a register $iv_{temp4}$,
5) to restore the value $iv_a$ in the register $iv_{pile}$ from the content of the register $iv_{temp3}$,
6) to back up in the stack 46 the content of the register ra,
7) to restore the value $iv_b$ in the register $iv_{pile}$ from the content of the register $iv_{temp4}$.

As a variant, only the return address is encrypted before being backed up in the stack 46. The other data backed up in the stack 46 are not encrypted or are encrypted using another key. For example, each return address backed up in the stack 46 is encrypted, by the module 28, with the key ka whereas the other data backed up in the stack 46 are not encrypted. In this case, if a datum stored in the stack 46 provokes a buffer overflow which replaces the cryptogram @ra2* with a cryptogram @rat*, then, after the execution of the functions $F_3$ and $F_2$, the execution of the code continues with the execution of the instruction situated at the address $f_{ka}^{-1}(@rat^*)$. Now, the hacker does not know the key ka and does not therefore know the address corresponding to $f_{ka}^{-1}(@rat^*)$. He or she cannot therefore predict the address to which the execution of the code 30 will be diverted. That therefore also renders buffer overflow attacks more difficult.

In a highly simplified embodiment, the encryption of the data $DF_3$ backed up in the stack 46 is not implemented. In this case, the value $iv_a$ and the data $DF_3$ backed up in the stack 46 are not encrypted. However, even in this simplified case, the fact that the address @ra2 backed up in the stack 46 is encrypted differently from what is done for the data $DF_3$ renders the buffer overflow attacks more difficult.

Variants Common to the Various Preceding Chapters

From the moment when a code line comprises at least one of the elements of the group composed of a message authentication code, of an error correcting code and of an error detecting code, it is possible to detect a modification of the content of this line. Thus, to detect a modification of the content of an instruction line or of a datum line, only one of any of the elements of this group is necessary.

In a highly simplified embodiment, none of the error detecting or correcting codes and none of the codes $MAC_j$ previously described are implemented. In this case, an error in the decryption of a datum or of an instruction can lead to the unit 10 being unable to execute an instruction and therefore to the abrupt stopping of the execution of the machine code 30.

The encryption and the decryption have been described in the particular case where the functions $f_{ka}$ and $f_{ka}^{-1}$ are encryption algorithms which use a "initialization vector" and, preferably, also a secret key ka. However, the functions $f_{ka}$ and $f_{ka}^{-1}$ can also be encryption/decryption algorithms in which an initialization vector is not necessary. However, everything which has been described here applies identically to such an encryption/decryption algorithm by simply replacing the term "initialization vector" with the term "key".

The function used to generate the cryptogram $CD_j^*$ can be different from that used to generate the cryptogram $CI_j^*$. For example, these two functions differ by the fact that they use different encryption keys.

In another variant, the keys ka and k' are the same.

The key ka can be prestored in the memory 29. In this case, the cryptogram ka* can be omitted from the block 34.

The cryptogram k'* of the key k' encrypted with the public key $pk_{CPU}$ can be stored in the block 34. In this case, the key k' does not need to be prestored in the memory 29.

A code line can be longer than a machine word. In this case, each code line is composed of several machine words generally situated at immediately consecutive memory addresses in the memory 4. In this case, a code line is loaded in the microprocessor 2 not in a single read operation, but by executing several read operations. Each read operation loads a respective machine word of the code line in the microprocessor.

As a variant, the operation 176 or 276 is continued systematically with the operation 178 or 278 even if the integrity or the authenticity of the cryptogram has not been able to be confirmed. In this case, the operation 176 or 276 is used to trigger the signalling of an execution fault without interrupting the execution of the binary code.

Depending on the instruction set used by the microprocessor 2, the instructions described such as "Load IV", "BranchIV", "StoreIV" each correspond to a single instruction of this set or, on the contrary, to a group of several instructions of this set.

Everything described in Chapter III can be implemented independently of what was described in the other chapters. For example, the steps 198 and 250 can be omitted and the method of FIG. 11 is not implemented.

Everything described in Chapter IV can be implemented independently of what was described in the other chapters. For example, what was described in Chapter IV can be implemented:

in the context of a machine code without any indirect branch instruction and "LoadIV ra" instruction, without implementing the teaching of Chapter III to secure the instructions of the machine code, without implementing the teaching of Chapter V to secure the stack 46 against buffer overflow attacks.

Everything described in Chapter V can also be implemented independently of what was described in the other chapters. For example, what was described in Chapter V can be implemented:

in the context of a machine code without any indirect branch instruction and "LoadIV ra" instruction, without implementing the teaching of Chapter III to secure the instructions of the machine code, without implementing the teaching of Chapter VI to secure the data stored in the part 44 of the memory 4.

All the embodiments described in this text and, in particular, the different variants, can be combined with one another.

CHAPTER IX: ADVANTAGES OF THE EMBODIMENTS DESCRIBED

Advantages of the Securing of the Machine Code:

Since the loading of the vector $iv_{lsbi}$ necessary to the decryption of the instruction lines of the basic block $BB_k$ is triggered upon the execution of the basic block $BB_{k-1}$, the integrity of the control flow is assured. Indeed, if, following the execution of the basic block $BB_{k-1}$, it is a basic block $BB_t$ which is executed instead of the basic block $BB_k$, then the instruction lines of the basic block $BB_t$ are decrypted using the vector $iv_k$ loaded. The instruction lines of the basic block $BB_t$ are not therefore decrypted using the vector $iv_t$ used to encrypt these instruction lines of the basic block $BB_t$. Thus, the decryption of the instruction lines of the block $BB_t$ is incorrect, which is detected. It is therefore difficult to divert the execution flow of the block $BB_k$ to the block $BB_t$.

The indirect load instruction does not directly contain the value of the vector $iv_k$ but only the identifier of a register intended to contain the address $@_k$ of the block $BB_k$. Thus, the basic block $BB_{k-1}$ contains only instructions which make it possible, at the time of the execution of this basic block $BB_{k-1}$, to construct this vector $iv_k$ from the content of the identified register. Consequently, the basic block $BB_{k-1}$ can be compiled independently of the following basic block $BB_k$. By virtue of that, the use of an indirect branch at the end of a basic block is made possible while retaining the possibility of controlling and guaranteeing the integrity of the control flow.

The fact that the content to be loaded in the register $iv_{lsbi}$ is stored in the first line of the basic block of the second type makes it possible to simply load this content in the microprocessor. Furthermore, the introduction of such a first datum line upon the generation of the machine code is simple.

The fact that the content to be loaded in the register $iv_{lsbi}$ is stored in the memory 4 in encrypted form increases the security.

The fact that the cryptogram $iv_{lsbi}^*$ is decrypted by using the address $@_j$ makes the swapping, in the memory 4, of two blocks of the second type difficult and detectable.

The encryption of the instructions $I_j$ makes it possible to guarantee the confidentiality of the binary code 30, which makes the "reverse engineering" of the binary code very difficult. The verification of the integrity of the cryptogram $CI_j^*$ or $CD_j^*$ makes it possible to detect the modifications of the binary code provoked, for example, by attacks such as fault injection into the memory 4. The fact that the authenticity of the instructions and of the data is verified makes it possible to detect and make very difficult the addition of additional instructions in the binary code 30 by a hacker, for example, to introduce malware therein such as viruses. Indeed, even if the attacker knows the algorithm used to encrypt the instructions $I_j$ or the data $D_j$, he or she does not know the secret key k' used to construct the code $MAC_j$.

The verification, using the code $ECC_{Ij}$ or $ECC_{Dj}$, of the existence of an error in the instruction $I_j$ or the datum $D_j$ just before it is used makes it possible to detect a modification of this instruction or of this datum $D_j$. Such modifications can be provoked by fault injection. Thus, the use of the code $ECC_{Ij}$ or $ECC_{Dj}$ makes it possible to detect this type of attack.

The fact that the code $ECC_{Ij}$ or $ECC_{Dj}$ is an error correcting code and not only an error detecting code, makes it possible to render the execution method more robust to fault injection attacks. Indeed, in this case, the error correcting code often makes it possible to correct the error introduced into the instruction $I_j$ or into the datum $D_j$ so that, despite the presence of such errors, the secured function continues to be executed correctly.

The use of the code $ECC_E$; makes it possible to more rapidly detect an error in the cryptogram $CI_j^*$ or $CD_j^*$ or in the code $MAC_j$ than if only the code $MAC_j$ were used for there. The use of the code $ECC_{Lj}$ therefore makes it possible to speed up the execution of the binary code.

The use of an error correcting code for the code $ECC_{Lj}$ makes it possible to render the method claimed more robust to attacks by fault injection in the memory 4 or in the medium 6. Indeed, in this case, the error correcting code often makes it possible to correct the cryptogram $CI_j^*$ or $CD_j^*$ or the code $MAC_j$ such that, despite the presence of such errors, the secured function is executed correctly.

Advantages of Securing Against Buffer Overflow Attacks:

The fact that the address @ra2 of the calling function $F_2$ is encrypted with a value $iv_a$ different from the value $iv_b$ used in the backing up of the data $DF_3$ of the called function $F_3$, makes it possible to render the buffer overflow attacks more difficult.

The fact that the data stored in the stack 46 are encrypted strengthens the security of the method.

The fact that the data backed up in the stack are encrypted as a function of a value which depends in addition on the address where the datum is backed up in the stack makes it possible to allow a random access to the data encrypted and backed up in the stack 46, while making it difficult to swap two data lines stored in this execution stack.

The use of an error detecting code associated with each datum backed up in the execution stack makes it possible to detect whether the decryption of a datum has proceeded correctly before this datum is used and processed in the execution of the machine code 30.

The decryption and the encryption of the address @ra2 in addition to using the key ka that is only known and stored in the module 28 makes it possible to render the implementation of a buffer overflow attack even more difficult.

Using an error correcting code as code $ECC_{Dj}$ makes it possible, in addition, to correct a detected error. That therefore makes it possible to continue the execution of the secured function even if an error has been signalled.

The invention claimed is:

1. A method for executing a binary code of a function secured by a microprocessor, said method comprising the following steps:

a) provision of the binary code, the binary code provided comprising a machine code containing a succession of basic blocks wherein:

each basic block comprises a succession of encrypted instruction lines each containing a cryptogram of an instruction, the encrypted instructions in these successive instruction lines being intended to be executed by the microprocessor systematically in the order of these instruction lines, each basic block begins at a branch address and ends with an instruction line containing the cryptogram of a branch instruction to a branch address of another basic block, said other basic block being called "the following basic block" and the basic block which ends with the instruction line containing the cryptogram of said branch instruction to said following basic block being called "the preceding basic block", the cryptogram contained in each encrypted instruction line of a basic block having been obtained using a same initialization vector different from the initialization vectors used to obtain the cryptograms of encrypted instruction lines of the other basic blocks, each preceding basic block contains an instruction line containing the cryptogram of a load instruction which, when it is executed by the microprocessor, provokes the loading, in the microprocessor, of the initialization vector to be used to decrypt the cryptogram of each encrypted instruction line of the following basic block, b) execution of the binary code by the microprocessor, in said execution, the method comprises the following operations:

execution of a preceding basic block, said execution of the preceding basic block comprising the decryption and the execution of the load instruction contained in the preceding basic block, then the decryption and the execution of the branch instruction, then execution of the following basic block, said execution of the following basic block comprising the decryption of the cryptogram of each encrypted instruction line of the following basic block using the initialization vector loaded in the microprocessor upon execution of the preceding basic block, wherein:

in the step a), the machine code provided comprises at least one first preceding basic block wherein:

the branch instruction is an indirect branch instruction, that is to say a branch instruction containing an operand which identifies a destination register and which, when it is executed by the microprocessor, provokes a branch directly to a first encrypted instruction line of a following basic block whose address is obtained from the content of said destination register, the load instruction is an indirect load instruction, that is to say a load instruction containing an operand which identifies the same destination register as that identified by the operand of the indirect branch instruction and which, when it is executed by the microprocessor, provokes:

reading of a data line associated with the address obtained from the content of the destination register, then construction of an initialization vector from the content of said data line, then loading of said constructed initialization vector in the microprocessor, the step b) also comprises:

execution of the indirect load instruction of the first preceding basic block, then execution of the indirect branch instruction of the first preceding basic block.

2. The method according to claim 1, wherein, in the step a), in the machine code provided, each data line is the first line of each basic block following the first preceding basic block, said data line, contrary to an instruction line, not coding any opcode of an instruction that is executable by the microprocessor.

3. The method according to claim 1, wherein, in the step b), the construction of the initialization vector from the content of the data line, comprises the decryption of a cryptogram $iv_{lsbi}*$ contained in said data line to obtain a first value, then the use of said first value to construct the initialization vector.

4. The method according to claim 3, wherein, in the step b), the construction of the initialization vector from the content of the data line comprises:
- construction of a second value from the address $@_j$ of the data line, then,
- decryption of the cryptogram $iv_{lsbi}*$ using said second value constructed from the address $@_j$.

5. The method according to claim 3, wherein:
- in the step a), the data line is provided and also comprises an error detecting code making it possible to detect an error in the first value obtained after decryption of the cryptogram $iv_{lsbi}*$, then
- in the step b), the construction of the initialization vector from the content of the data line also comprises the following operations:
- verification, using the error detecting code contained in said data line, of whether there is an error in the first value obtained after decryption of the cryptogram $iv_{lsbi}*$, and
- when such an error exists, the triggering of a signalling of an execution fault and, alternatively, when such an error does not exist, the inhibition of said signalling of an execution fault.

6. The method according to claim 1, wherein:
- in the step a), each encrypted instruction line provided contains:
- a cryptogram of a concatenation:
- of said instruction, and
- of a first error detecting code making it possible to detect an error in the instruction with which it is concatenated, and
- in the step b), each time the microprocessor loads an instruction line, the method comprises the following operations:
- decryption of the cryptogram to obtain a decrypted instruction and the first decrypted error detecting code, then
- verification, using the first decrypted error detecting code, of whether there is an error in said decrypted instruction, and, in the case where such an error is detected in said decrypted instruction, the triggering of the signalling of an execution fault, and, in the case where no error has been detected in said decrypted instruction, the microprocessor decodes the decrypted instruction and transmits it to an arithmetic and logic unit which executes it.

7. The method according to claim 6, wherein:
- in the step a), each instruction line also contains a message authentication code making it possible to check the integrity and the authenticity of the cryptogram contained in the same line, and
- in the step b), each time the microprocessor loads an instruction line, the method comprises the following operations:
- construction of a label from a cryptogram contained in the loaded code line, then
- encryption of the constructed label using a secret key stored in a non-volatile memory of a hardware securing module, then
- comparison of the encrypted label with the message authentication code contained in the loaded instruction line, then
- when the encrypted label is not identical to the message authentication code contained in the loaded instruction line, the triggering of the signalling of an execution fault, and, otherwise, the microprocessor decodes the decrypted instruction and transmits it to the arithmetic and logic unit which executes it.

8. The method according to claim 1, wherein the content of the destination register is unknown at the time when the binary code is generated by a compiler.

9. A non-transitory computer program product embodied on a computer readable storage medium, comprising a binary code of a secured function that can be executed by a microprocessor for the implementation of an execution method comprising the following steps:

a) provision of the binary code, the binary code provided comprising a machine code containing a succession of basic blocks wherein:
- each basic block comprises a succession of encrypted instruction lines each containing a cryptogram of an instruction, the encrypted instructions in these successive instruction lines being intended to be executed by the microprocessor systematically in the order of these instruction lines,
- each basic block begins at a branch address and ends with an instruction line containing the cryptogram of a branch instruction to a branch address of another basic block, said other basic block being called "the following basic block" and the basic block which ends with the instruction line containing the cryptogram of said branch instruction to said following basic block being called "the preceding basic block",
- the cryptogram contained in each encrypted instruction line of a basic block having been obtained using a same initialization vector different from the initialization vectors used to obtain the cryptograms of encrypted instruction lines of the other basic blocks,
- each preceding basic block contains an instruction line containing the cryptogram of a load instruction which, when it is executed by the microprocessor, provokes the loading, in the microprocessor, of the initialization vector to be used to decrypt the cryptogram of each encrypted instruction line of the following basic block, b) execution of the binary code by the microprocessor, in said execution, the method comprises the following operations:
- execution of a preceding basic block, said execution of the preceding basic block comprising the decryption and the execution of the load instruction contained in the preceding basic block, then the decryption and the execution of the branch instruction, then
- execution of the following basic block, said execution of the following basic block comprising the decryption of the cryptogram of each encrypted instruction line of the following basic block using the initialization vector loaded in the microprocessor upon execution of the preceding basic block, wherein:

in the step a), the machine code provided comprises at least one first preceding basic block wherein:

the branch instruction is an indirect branch instruction, that is to say a branch instruction containing an operand which identifies a destination register and which, when it is executed by the microprocessor, provokes a branch directly to a first encrypted instruction line of a following basic block whose address is obtained from the content of said destination register, the load instruction is an indirect load instruction, that is to say a load instruction containing an operand which identifies the same destination register as that identified by the operand of the indirect branch instruction and which, when it is executed by the microprocessor, provokes:

reading of a data line associated with the address obtained from the content of the destination register, then construction of an initialization vector from the content of said data line, then loading of said constructed initialization vector in the microprocessor, the step b) also comprises:

execution of the indirect load instruction of the first preceding basic block, then execution of the indirect branch instruction of the first preceding basic block.

10. An electronic device comprising:

a memory that stores a binary code; and a microprocessor configured to retrieve the binary code to perform the following steps:

a) provision of the binary code, the binary code provided comprising a machine code containing a succession of basic blocks wherein:

each basic block comprises a succession of encrypted instruction lines each containing a cryptogram of an instruction, the encrypted instructions in these successive instruction lines being intended to be executed by the microprocessor systematically in the order of these instruction lines, each basic block begins at a branch address and ends with an instruction line containing the cryptogram of a branch instruction to a branch address of another basic block, said other basic block being called "the following basic block" and the basic block which ends with the instruction line containing the cryptogram of said branch instruction to said following basic block being called "the preceding basic block", the cryptogram contained in each encrypted instruction line of a basic block having been obtained using a same initialization vector different from the initialization vectors used to obtain the cryptograms of encrypted instruction lines of the other basic blocks, each preceding basic block contains an instruction line containing the cryptogram of a load instruction which, when it is executed by the microprocessor, provokes the loading, in the microprocessor, of the initialization vector to be used to decrypt the cryptogram of each encrypted instruction line of the following basic block, b) execution of the binary code by the microprocessor, in said execution, the method comprises the following operations:

execution of a preceding basic block, said execution of the preceding basic block comprising the decryption and the execution of the load instruction contained in the preceding basic block, then the decryption and the execution of the branch instruction, then execution of the following basic block, said execution of the following basic block comprising the decryption of the cryptogram of each encrypted instruction line of the following basic block using the initialization vector loaded in the microprocessor upon execution of the preceding basic block, wherein:

in the step a), the machine code provided comprises at least one first preceding basic block wherein:

the branch instruction is an indirect branch instruction, that is to say a branch instruction containing an operand which identifies a destination register and which, when it is executed by the microprocessor, provokes a branch directly to a first encrypted instruction line of a following basic block whose address is obtained from the content of said destination register, the load instruction is an indirect load instruction, that is to say a load instruction containing an operand which identifies the same destination register as that identified by the operand of the indirect branch instruction and which, when it is executed by the microprocessor, provokes:

reading of a data line associated with the address obtained from the content of the destination register, then construction of an initialization vector from the content of said data line, then loading of said constructed initialization vector in the microprocessor, the step b) also comprises:

execution of the indirect load instruction of the first preceding basic block, then execution of the indirect branch instruction of the first preceding basic block.

11. The electronic device according to claim 10, wherein the microprocessor further includes a hardware securing module, wherein the hardware securing module is configured to construct the initialization vector from the content of the data line associated with the address obtained from the content of the destination register.

* * * * *